United States Patent
Khoshnevisan et al.

(10) Patent No.: US 12,369,045 B2
(45) Date of Patent: Jul. 22, 2025

(54) QUASI CO-LOCATION PRIORITIZATION FOR WIRELESS COMMUNICATIONS SYSTEMS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 17/725,203

(22) Filed: Apr. 20, 2022

(65) Prior Publication Data

US 2022/0361005 A1 Nov. 10, 2022

Related U.S. Application Data

(60) Provisional application No. 63/186,636, filed on May 10, 2021.

(51) Int. Cl.
*H04W 16/28* (2009.01)
*H04W 24/08* (2009.01)
(Continued)

(52) U.S. Cl.
CPC ........... *H04W 16/28* (2013.01); *H04W 24/08* (2013.01); *H04W 72/046* (2013.01); *H04W 72/23* (2023.01); *H04W 72/56* (2023.01)

(58) Field of Classification Search
CPC ... H04W 16/28; H04W 24/08; H04W 72/046; H04W 72/23; H04W 72/56; H04B 7/088; H04B 7/0408; H04L 5/0023; H04L 5/0064

See application file for complete search history.

(56) References Cited

U.S. PATENT DOCUMENTS

| | | | |
|---|---|---|---|
| 2019/0253904 A1* | 8/2019 | Tsai | H04W 16/14 |
| 2020/0145982 A1* | 5/2020 | Cheng | H04W 72/23 |

(Continued)

FOREIGN PATENT DOCUMENTS

EP 4319374 A1 * 2/2024 ........... H04L 5/0023

OTHER PUBLICATIONS

3GPP TS 38.213 (Year: 2020).*

(Continued)

*Primary Examiner* — Mohammad S Anwar
(74) *Attorney, Agent, or Firm* — Holland & Hart LLP

(57) ABSTRACT

Methods, systems, and devices for wireless communications are described. A wireless communications system may support quasi co-location prioritization techniques. A user equipment (UE) may receive control signaling to monitor at least one control resource set. The UE may receive a control message to monitor a shared data channel that overlaps in time with the at least one control resource set. For example, the control message may schedule a downlink message via the shared data channel in a time period of the at least one control resource set. The UE may monitor the at least one control resource set, the shared data channel, or both based on one or more priority rules. A priority rule may indicate to monitor a corresponding control resource set, shared data channel, or both based on whether the quasi co-location assumptions of the various control resource sets or shared data channels are the same or different.

29 Claims, 18 Drawing Sheets

(51) Int. Cl.
*H04W 72/044* (2023.01)
*H04W 72/23* (2023.01)
*H04W 72/56* (2023.01)

(56) References Cited

U.S. PATENT DOCUMENTS

2020/0221485 A1* 7/2020 Cirik .................. H04L 25/0224
2020/0336928 A1 10/2020 Seo et al.
2022/0272743 A1* 8/2022 Cirik .................... H04L 5/0053

OTHER PUBLICATIONS

3GPP TS 38.214 (Year: 2020).*
International Search Report and Written Opinion—PCT/US2022/025813—ISA/EPO—Jul. 19, 2022.

* cited by examiner

QUASI CO-LOCATION PRIORITIZATION FOR WIRELESS COMMUNICATIONS SYSTEMS

CROSS REFERENCE

The present application for patent claims the benefit of U.S. Provisional Patent Application No. 63/186,636 by KHOSHNEVISAN et al., entitled "QUASI CO-LOCATION PRIORITIZATION FOR WIRELESS COMMUNICATIONS SYSTEMS," filed May 10, 2021, assigned to the assignee hereof, and expressly incorporated by reference herein.

FIELD OF TECHNOLOGY

The following relates to wireless communications, including quasi co-location prioritization for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE). In some wireless communications systems, downlink control messages (e.g., downlink control information (DCI) messages) may schedule other downlink messages from a network entity to a UE. However, in some cases the UE may be unable to efficiently receive the one or more downlink control messages or other downlink messages.

SUMMARY

The described techniques relate to improved methods, systems, devices, and apparatuses that support quasi co-location (QCL) prioritization for wireless communications systems. Generally, the described techniques enable devices in a wireless communications system to implement one or more priority rules for allocating receive beams for various communications. For example, a user equipment (UE) may receive control signaling indicating to monitor one or more control resource sets (CORESETs). The UE may receive a control message scheduling a downlink message (e.g., a shared data channel message). In some examples, the downlink message may overlap in time with the one or more control resource sets. The UE may monitor the downlink message (e.g., the shared data channel), the one or more CORESETs, or a combination thereof in accordance with a priority rule. The priority rule may indicate which QCL properties to use for monitoring the control resource sets, the downlink message, or both. By implementing such priority rules, the UE may efficiently allocate receive beams to receive the communications, which may result in improved communications efficiency, reliability, or both.

A method for wireless communication at a UE is described. The method may include receiving control signaling indicating to the UE to monitor at least one CORESET, receiving a control message indicating to the UE to monitor a shared data channel that overlaps in time with the at least one CORESET, and monitoring, via a set of multiple receive beams, the at least one CORESET, the shared data channel, or both, based on a priority rule for allocating the set of multiple receive beams of the UE for monitoring of the at least one CORESET, the shared data channel, or both.

An apparatus for wireless communication at a UE is described. The apparatus may include a processor, memory coupled with the processor, and instructions stored in the memory. The instructions may be executable by the processor to cause the apparatus to receive control signaling indicating to the UE to monitor at least one CORESET, receive a control message indicating to the UE to monitor a shared data channel that overlaps in time with the at least one CORESET, and monitor, via a set of multiple receive beams, the at least one CORESET, the shared data channel, or both, based on a priority rule for allocating the set of multiple receive beams of the UE for monitoring of the at least one CORESET, the shared data channel, or both.

Another apparatus for wireless communication at a UE is described. The apparatus may include means for receiving control signaling indicating to the UE to monitor at least one CORESET, means for receiving a control message indicating to the UE to monitor a shared data channel that overlaps in time with the at least one CORESET, and means for monitoring, via a set of multiple receive beams, the at least one CORESET, the shared data channel, or both, based on a priority rule for allocating the set of multiple receive beams of the UE for monitoring of the at least one CORESET, the shared data channel, or both.

A non-transitory computer-readable medium storing code for wireless communication at a UE is described. The code may include instructions executable by a processor to receive control signaling indicating to the UE to monitor at least one CORESET, receive a control message indicating to the UE to monitor a shared data channel that overlaps in time with the at least one CORESET, and monitor, via a set of multiple receive beams, the at least one CORESET, the shared data channel, or both, based on a priority rule for allocating the set of multiple receive beams of the UE for monitoring of the at least one CORESET, the shared data channel, or both.

In some examples of the method, apparatuses, and non-transitory computer-readable medium described herein, monitoring may include operations, features, means, or instructions for monitoring, via the set of multiple receive beams, a set of multiple CORESETs including the at least one CORESET based on the priority rule indicating to monitor the set of multiple CORESETs when each of the set of multiple CORESETs corresponds to a same QCL assumption that differs from a QCL assumption of the shared data channel.

Some examples of the method, apparatuses, and non-transitory computer-readable medium described herein may further include operations, features, means, or instructions for refraining from monitoring the shared data channel based on each of the set of multiple CORESETs corresponding to the same QCL assumption that differs from the QCL assumption of the shared data channel.

In some examples of the method, apparatuses, and non-transitory computer-readable medium described herein, monitoring may include operations, features, means, or instructions for monitoring a set of multiple CORESETs including the at least one CORESET via a first beam of the set of multiple receive beams and the shared data channel via a second beam of the set of multiple receive beams based on the priority rule indicating to monitor the set of multiple CORESETs via the first beam when each of the set of multiple CORESETs corresponds to a same QCL assumption that differs from a second QCL assumption of the shared data channel.

In some examples of the method, apparatuses, and non-transitory computer-readable medium described herein, monitoring may include operations, features, means, or instructions for monitoring, via the set of multiple receive beams, a set of multiple CORESETs including the at least one CORESET based on the priority rule indicating to monitor the set of multiple CORESETs when the set of multiple CORESETs and the shared data channel each correspond to a different respective QCL assumption.

In some examples of the method, apparatuses, and non-transitory computer-readable medium described herein, monitoring may include operations, features, means, or instructions for monitoring the at least one CORESET of a set of multiple CORESETs via a first beam of the set of multiple receive beams and monitoring the shared data channel and a second CORESET of the set of multiple CORESETs via a second beam of the set of multiple receive beams based on the priority rule indicating to monitor the at least one CORESET via the first beam and to monitor the shared data channel and the second CORESET via the second beam when the second CORESET and the shared data channel correspond to a same QCL assumption.

In some examples of the method, apparatuses, and non-transitory computer-readable medium described herein, monitoring may include operations, features, means, or instructions for monitoring the single CORESET via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states when the set of multiple transmission configuration indicator states each correspond to a different QCL assumption than the shared data channel.

In some examples of the method, apparatuses, and non-transitory computer-readable medium described herein, monitoring may include operations, features, means, or instructions for monitoring the single CORESET via a first beam of the set of multiple receive beams associated with a first QCL assumption of the set of multiple QCL assumptions and via a second beam of the set of multiple receive beams associated with a second QCL assumption of the set of multiple QCL assumptions, and monitoring the shared data channel via the second beam, when the single CORESET and the shared data channel correspond to a same QCL assumption.

In some examples of the method, apparatuses, and non-transitory computer-readable medium described herein, monitoring may include operations, features, means, or instructions for monitoring, via the set of multiple receive beams, a set of multiple CORESETs including the at least one CORESET based on the priority rule indicating to monitor the set of multiple CORESETs when each of the set of multiple CORESETs corresponds to a same QCL assumption that differs from the first QCL assumption and the second QCL assumption of the shared data channel.

Some examples of the method, apparatuses, and non-transitory computer-readable medium described herein may further include operations, features, means, or instructions for refraining from monitoring the shared data channel based on each of the set of multiple CORESETs corresponding to the same QCL assumption that differs from the first QCL assumption and the second QCL assumption of the shared data channel.

In some examples of the method, apparatuses, and non-transitory computer-readable medium described herein, monitoring may include operations, features, means, or instructions for monitoring, via the set of multiple receive beams, a set of multiple CORESETs including the at least one CORESET via a first beam and the shared data channel using a second beam corresponding to one of the first QCL assumption or the second QCL assumption based on the priority rule indicating to monitor the set of multiple CORESETs when the set of multiple CORESETs each correspond to a same QCL assumption that differs from the first QCL assumption and the second QCL assumption of the shared data channel.

In some examples of the method, apparatuses, and non-transitory computer-readable medium described herein, monitoring may include operations, features, means, or instructions for monitoring the at least one CORESET of a set of multiple CORESETs via a first beam of the set of multiple receive beams and monitoring the shared data channel and a second CORESET of the set of multiple CORESETs via a second beam of the set of multiple receive beams based on the priority rule indicating to monitor the at least one CORESET via the first beam and to monitor the shared data channel and the second CORESET via the second beam when the second CORESET corresponds to a same QCL assumption as the first QCL assumption or the second QCL assumption for the shared data channel.

In some examples of the method, apparatuses, and non-transitory computer-readable medium described herein, monitoring may include operations, features, means, or instructions for monitoring, via the set of multiple receive beams, a set of multiple CORESETs including the at least one CORESET based on the priority rule indicating to monitor the set of multiple CORESETs when the set of multiple CORESETs each correspond to a different QCL assumption that differs from the first QCL assumption, the second QCL assumption, or both of the shared data channel.

In some examples of the method, apparatuses, and non-transitory computer-readable medium described herein, monitoring may include operations, features, means, or instructions for monitoring the at least one CORESET of a set of multiple CORESETs via a first beam of the set of multiple receive beams and monitoring the shared data channel and a second CORESET of the set of multiple CORESETs via a second beam of the set of multiple receive beams based on the priority rule indicating to monitor the at least one CORESET via the first beam and to monitor the shared data channel and the second CORESET via the second beam when the second CORESET corresponds to a same QCL assumption as the first QCL assumption or the second QCL assumption for the shared data channel.

In some examples of the method, apparatuses, and non-transitory computer-readable medium described herein, monitoring may include operations, features, means, or instructions for monitoring a first CORESET of the at least one CORESET and the shared data channel via a first beam of the set of multiple receive beams, and monitoring a second CORESET of the at least one CORESET and the shared data channel via a second beam of the set of multiple receive beams, based on the priority rule indicating to monitor the first CORESET and the shared data channel via the first beam and to monitor the second CORESET and the shared data channel via the second beam when the first CORESET corresponds to the first QCL assumption and the second CORESET corresponds to the second QCL assumption.

In some examples of the method, apparatuses, and non-transitory computer-readable medium described herein, monitoring may include operations, features, means, or instructions for monitoring the single CORESET via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states when the set of multiple transmission configuration indicator states each correspond to a respective different QCL assumption than the first QCL assumption and the second QCL assumption.

Some examples of the method, apparatuses, and non-transitory computer-readable medium described herein may further include operations, features, means, or instructions for refraining from monitoring the shared data channel based on the set of multiple transmission configuration indicator states each corresponding to the respective different QCL assumptions than the first QCL assumption and the second QCL assumption.

In some examples of the method, apparatuses, and non-transitory computer-readable medium described herein, monitoring may include operations, features, means, or instructions for monitoring the single CORESET via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states, and monitoring the shared data channel via the second QCL assumption when one of the set of multiple transmission configuration indicator states of the single CORESET corresponds to the first QCL assumption or the second QCL assumption.

Some examples of the method, apparatuses, and non-transitory computer-readable medium described herein may further include operations, features, means, or instructions for receiving at least one control message via the at least one CORESET, a data message via the shared data channel, or both, based on the monitoring.

In some examples of the method, apparatuses, and non-transitory computer-readable medium described herein, receiving the control signaling may include operations, features, means, or instructions for receiving the control signaling indicating the priority rule.

In some examples of the method, apparatuses, and non-transitory computer-readable medium described herein, a time difference between the control message and a scheduled occasion to monitor the shared data channel fails to satisfy a threshold time duration, one or more QCL assumptions of the shared data channel includes a default assumption, the one or more QCL assumptions of the shared data channel may be based on one or more multiplexing schemes, the shared data channel and the at least one CORESET may be in different component carriers for intra-band carrier aggregation, or any combination thereof.

A method for wireless communication at a network entity is described. The method may include transmitting control signaling indicating to a UE to monitor at least one CORESET, transmitting a control message indicating to the UE to monitor a shared data channel that overlaps in time with the at least one CORESET, and transmitting, the at least one CORESET, the shared data channel, or both, based on a priority rule for the UE to allocate a set of multiple receive beams for monitoring of the at least one CORESET, the shared data channel, or both.

An apparatus for wireless communication at a network entity is described. The apparatus may include a processor, memory coupled with the processor, and instructions stored in the memory. The instructions may be executable by the processor to cause the apparatus to transmit control signaling indicating to a UE to monitor at least one CORESET, transmit a control message indicating to the UE to monitor a shared data channel that overlaps in time with the at least one CORESET, and transmit, the at least one CORESET, the shared data channel, or both, based on a priority rule for the UE to allocate a set of multiple receive beams for monitoring of the at least one CORESET, the shared data channel, or both.

Another apparatus for wireless communication at a network entity is described. The apparatus may include means for transmitting control signaling indicating to a UE to monitor at least one CORESET, means for transmitting a control message indicating to the UE to monitor a shared data channel that overlaps in time with the at least one CORESET, and means for transmitting, the at least one CORESET, the shared data channel, or both, based on a priority rule for the UE to allocate a set of multiple receive beams for monitoring of the at least one CORESET, the shared data channel, or both.

A non-transitory computer-readable medium storing code for wireless communication at a network entity is described. The code may include instructions executable by a processor to transmit control signaling indicating to a UE to monitor at least one CORESET, transmit a control message indicating to the UE to monitor a shared data channel that overlaps in time with the at least one CORESET, and transmit, the at least one CORESET, the shared data channel, or both, based on a priority rule for the UE to allocate a set of multiple receive beams for monitoring of the at least one CORESET, the shared data channel, or both.

In some examples of the method, apparatuses, and non-transitory computer-readable medium described herein, the transmitting may include operations, features, means, or instructions for transmitting, via a set of multiple transmit beams corresponding to the set of multiple receive beams of the UE, a set of multiple CORESETs including the at least one CORESET based on the priority rule indicating the UE may be to monitor the set of multiple CORESETs when each of the set of multiple CORESETs corresponds to a same QCL assumption that differs from a QCL assumption of the shared data channel.

In some examples of the method, apparatuses, and non-transitory computer-readable medium described herein, the transmitting may include operations, features, means, or instructions for transmitting a set of multiple CORESETs including the at least one CORESET via a first transmit beam corresponding to a first receive beam of the set of multiple receive beams and the shared data channel via a second transmit beam corresponding to a second receive beam of the set of multiple receive beams based on the priority rule indicating the UE may be to monitor the set of multiple CORESETs via the first receive beam when each of the set of multiple CORESETs corresponds to a same QCL assumption that differs from a second QCL assumption of the shared data channel.

In some examples of the method, apparatuses, and non-transitory computer-readable medium described herein, the transmitting may include operations, features, means, or instructions for transmitting, via a set of multiple transmit beams corresponding to the set of multiple receive beams of the UE, a set of multiple CORESETs including the at least one CORESET based on the priority rule indicating the UE may be to monitor the set of multiple CORESETs when the set of multiple CORESETs and the shared data channel each correspond to a different respective QCL assumption.

In some examples of the method, apparatuses, and non-transitory computer-readable medium described herein, the transmitting may include operations, features, means, or instructions for transmitting the at least one CORESET of a set of multiple CORESETs via a first transmit beam corresponding to a first receive beam of the set of multiple receive beams and transmitting the shared data channel and a second CORESET of the set of multiple CORESETs via a second transmit beam corresponding to a second receive beam of the set of multiple receive beams based on the priority rule indicating the UE may be to monitor the at least one CORESET via the first receive beam and to monitor the shared data channel and the second CORESET via the second receive beam when the second CORESET and the shared data channel correspond to a same QCL assumption.

In some examples of the method, apparatuses, and non-transitory computer-readable medium described herein, the transmitting may include operations, features, means, or instructions for transmitting the single CORESET via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states when the set of multiple transmission configuration indicator states each correspond to a different QCL assumption than the shared data channel.

In some examples of the method, apparatuses, and non-transitory computer-readable medium described herein, the transmitting may include operations, features, means, or instructions for transmitting the single CORESET via a first transmit beam corresponding to a first receive beam of the set of multiple receive beams associated with a first QCL assumption of the set of multiple QCL assumptions and via a second transmit beam corresponding to a second receive beam of the set of multiple receive beams associated with a second QCL assumption of the set of multiple QCL assumptions, and transmitting the shared data channel via the second transmit beam when the single CORESET and the shared data channel correspond to a same QCL assumption.

In some examples of the method, apparatuses, and non-transitory computer-readable medium described herein, the transmitting may include operations, features, means, or instructions for transmitting, via a set of multiple transmit beams corresponding to the set of multiple receive beams of the UE, a set of multiple CORESETs including the at least one CORESET based on the priority rule indicating the UE may be to monitor the set of multiple CORESETs when each of the set of multiple CORESETs corresponds to a same QCL assumption that differs from the first QCL assumption and the second QCL assumption of the shared data channel.

In some examples of the method, apparatuses, and non-transitory computer-readable medium described herein, the transmitting may include operations, features, means, or instructions for transmitting, via a set of multiple transmit beams corresponding to the set of multiple receive beams of the UE, a set of multiple CORESETs including the at least one CORESET via a first transmit beam and the shared data channel using a second transmit beam corresponding to one of the first QCL assumption or the second QCL assumption based on the priority rule indicating the UE may be to monitor the set of multiple CORESETs when the set of multiple CORESETs each correspond to a same QCL assumption that differs from the first QCL assumption and the second QCL assumption of the shared data channel.

In some examples of the method, apparatuses, and non-transitory computer-readable medium described herein, the transmitting may include operations, features, means, or instructions for transmitting the at least one CORESET of a set of multiple CORESETs via a first transmit beam corresponding to a first receive beam of the set of multiple receive beams and monitoring the shared data channel and a second CORESET of the set of multiple CORESETs via a second transmit beam corresponding to a second receive beam of the set of multiple receive beams based on the priority rule indicating the UE may be to monitor the at least one CORESET via the first receive beam and to monitor the shared data channel and the second CORESET via the second receive beam when the second CORESET corresponds to a same QCL assumption as the first QCL assumption or the second QCL assumption for the shared data channel.

In some examples of the method, apparatuses, and non-transitory computer-readable medium described herein, the transmitting may include operations, features, means, or instructions for transmitting, via a set of multiple transmit beams corresponding to the set of multiple receive beams of the UE, a set of multiple CORESETs including the at least one CORESET based on the priority rule indicating the UE may be to monitor the set of multiple CORESETs when the set of multiple CORESETs each correspond to a different QCL assumption that differs from the first QCL assumption, the second QCL assumption, or both of the shared data channel.

In some examples of the method, apparatuses, and non-transitory computer-readable medium described herein, the transmitting may include operations, features, means, or instructions for transmitting the at least one CORESET of a set of multiple CORESETs via a first transmit beam corresponding to a first receive beam of the set of multiple receive beams and transmitting the shared data channel and a second CORESET of the set of multiple CORESETs via a second transmit beam corresponding to a second receive beam of the set of multiple receive beams based on the priority rule indicating the UE may be to monitor the at least one CORESET via the first receive beam and to monitor the shared data channel and the second CORESET via the second receive beam when the second CORESET corresponds to a same QCL assumption as the first QCL assumption or the second QCL assumption for the shared data channel.

In some examples of the method, apparatuses, and non-transitory computer-readable medium described herein, the transmitting may include operations, features, means, or instructions for transmitting a first CORESET of the at least one CORESET and the shared data channel via a first transmit beam corresponding to a first receive beam of the set of multiple receive beams, and transmitting a second CORESET of the at least one CORESET and the shared data channel via a second transmit beam corresponding to a second receive beam of the set of multiple receive beams based on the priority rule indicating the UE may be to monitor the first CORESET and the shared data channel via the first receive beam and to monitor the second CORESET and the shared data channel via the second receive beam when the first CORESET corresponds to the first QCL assumption and the second CORESET corresponds to the second QCL assumption.

In some examples of the method, apparatuses, and non-transitory computer-readable medium described herein, the transmitting may include operations, features, means, or instructions for transmitting the single CORESET via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states when the set of multiple transmission configuration indicator states each correspond to a respective different QCL assumption than the first QCL assumption and the second QCL assumption.

In some examples of the method, apparatuses, and non-transitory computer-readable medium described herein, the transmitting may include operations, features, means, or instructions for transmitting the single CORESET via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states, and transmitting the shared data channel via the second QCL assumption when one of the set of multiple transmission configuration indicator states of the single CORESET corresponds to the first QCL assumption or the second QCL assumption.

Some examples of the method, apparatuses, and non-transitory computer-readable medium described herein may further include operations, features, means, or instructions for transmitting at least one control message via the at least one CORESET, a data message via the shared data channel, or both.

In some examples of the method, apparatuses, and non-transitory computer-readable medium described herein, transmitting the control signaling may include operations, features, means, or instructions for transmitting the control signaling indicating the priority rule.

In some examples of the method, apparatuses, and non-transitory computer-readable medium described herein, a time difference between the control message and a scheduled occasion to monitor the shared data channel fails to satisfy a threshold time duration, one or more QCL assumptions of the shared data channel includes a default assumption, the one or more QCL assumptions of the shared data channel may be based on one or more multiplexing schemes, the shared data channel and the at least one CORESET may be in different component carriers for intra-band carrier aggregation, or any combination thereof.

DETAILED DESCRIPTION

Figure 1:
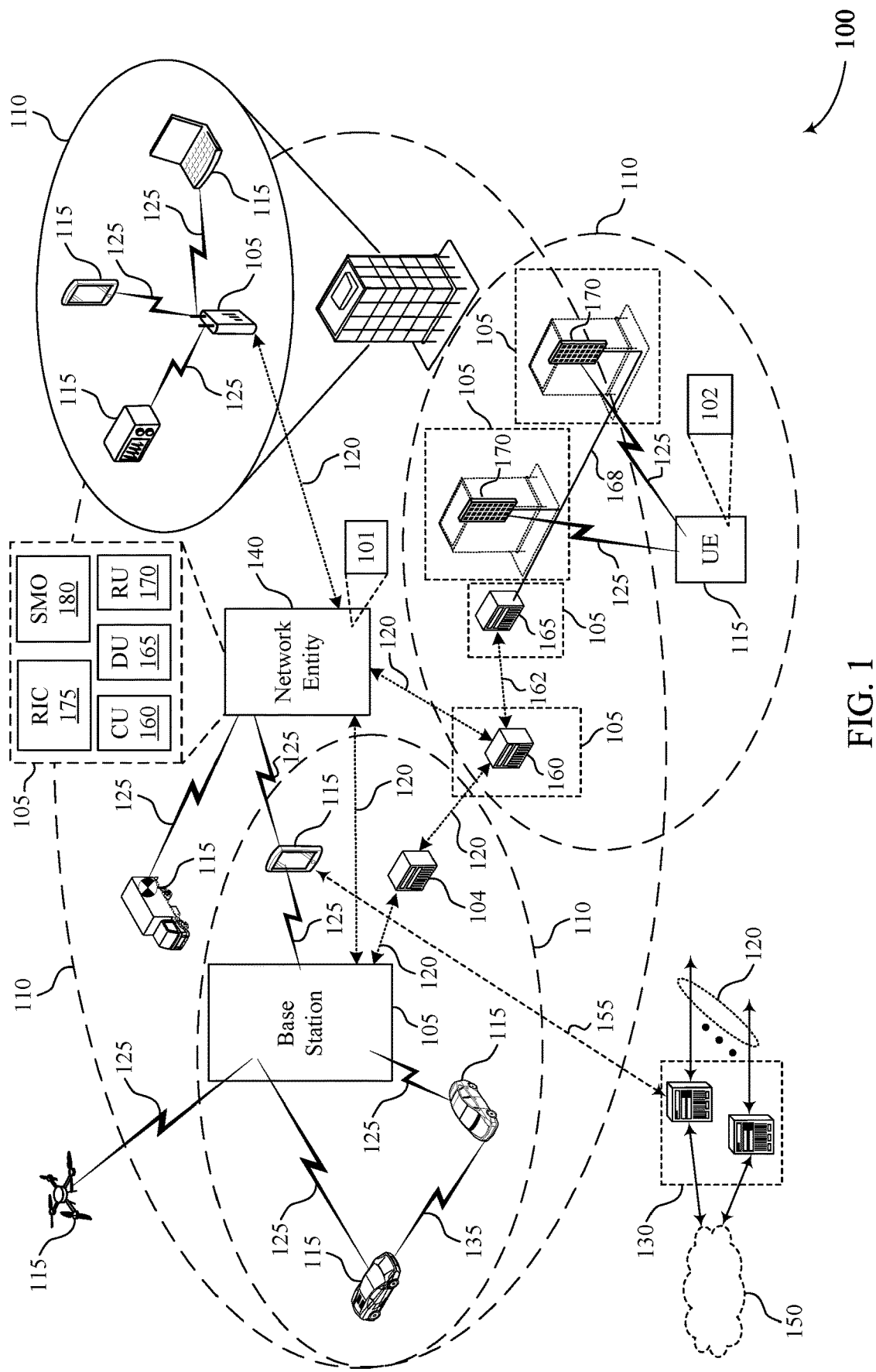
FIG. 1 illustrates an example of a wireless communications system that supports quasi co-location prioritization for wireless communications systems in accordance with aspects of the present disclosure.

In some wireless communications systems, downlink control messages (e.g., DCI messages) may schedule communication of other downlink messages (e.g., physical downlink shared channel (PDSCH) messages) from a network entity to a UE. The UE may be configured to determine what QCL assumption (e.g., QCL parameters or QCL type properties, beam parameters, transmission configuration indicator (TCI) state, and the like) is to be used for receiving the scheduled downlink PDSCH message based on the downlink control message. For example, the QCL assumption used for receiving the downlink control message may also be used for the scheduled downlink PDSCH message or another QCL assumption may be used.

In some cases, the UE may monitor one or more control resource sets (CORESETs) for multiple linked control channel candidates (e.g., physical downlink control channel (PDCCH) candidates). That is, the control channel candidates may be linked for multiple repetitions of the same downlink control message. For example, a same downlink control information (DCI) payload may be transmitted via two (or more) PDCCH candidates in a slot (e.g., the PDCCH candidates may overlap in time). In some examples, each of the control channel candidates may be associated with one or more QCL assumptions. Additionally or alternatively, the scheduled PDSCH may be associated with one or more QCL assumptions. However, some wireless communications systems may not provide a UE with a mechanism for determining which QCL assumptions should be used for monitoring or receiving one or more CORESETs, a shared data channel, or both.

Accordingly, the techniques described herein may enable devices in a wireless communications system to implement one or more priority rules for allocating receive beams for various communications. For example, a UE may receive control signaling indicating that the UE is to monitor one or more CORESETs. Additionally, the UE may receive a control message scheduling a downlink message (e.g., a PDSCH message). In some examples, the downlink message may overlap in time with the one or more control resource sets. The UE may monitor the downlink message (e.g., the shared data channel), the one or more CORESETs, or a combination thereof in accordance with a priority rule. The priority rule may indicate which QCL assumptions for the UE to use for monitoring the control resource sets, the downlink message, or both. For the purposes of the present disclosure, the terms "TCI state" and "QCL assumption" may be used to refer to a beam (or set of beams) which are used to transmit/receive a message between wireless devices. Accordingly, the terms "beam," "TCI state," "QCL assumption," "QCL parameters," "QCL properties," and the like may be used interchangeably.

In some examples, the downlink message may correspond to one or more TCI states. The priority rule may indicate which QCL assumptions the UE should use to monitor the one or more CORESETs in addition or alternative to the downlink message. As an illustrative example, the UE may be capable of reception via two beams (e.g., the UE may implement up to two QCL assumptions for monitoring or receiving communications). The UE may be indicated to monitor one or more CORESETs associated with one or more QCL assumptions (e.g., a single CORESET associated with one or more QCL assumptions, two CORESETs each associated with a respective QCL assumption, and so on). Further, the UE may be indicated to monitor the downlink message associated with a TCI. In other words, the UE may be capable of reception using up to two QCL assumptions but may be indicated to monitor the CORESETs and downlink message using one, two, three, or four QCL assumptions in a same time period (e.g., in a slot). Thus, the UE may identify the QCL assumptions for monitoring (or refraining from monitoring) the CORESETs and downlink message based on the one or more priority rules indicating the QCL assumptions for a respective scenario. For example, a priority rule may indicate the QCL assumptions to use when the downlink message corresponds to one or more different QCL assumptions as the one or more CORESETs, when the downlink message corresponds to one or more of the same QCL assumptions as the one or more CORESETs, or any combination thereof, among other examples described herein. By implementing such priority rules, the UE may efficiently allocate receive beams to receive the various communications (e.g., CORESETs, downlink messages, or both), which may result in improved communications efficiency, reliability, or both.

Aspects of the disclosure are initially described in the context of wireless communications systems. Some example techniques may relate to PDCCH and PDSCH QCL-TypeD prioritization in the presence of PDCCH repetition. Additional aspects of the disclosure are described in the context of an example resource configuration, example priority schemes, and an example process flow. Aspects of the disclosure are further illustrated by and described with reference to apparatus diagrams, system diagrams, and flowcharts that relate to quasi co-location prioritization for wireless communications systems.

FIG. 1 illustrates an example of a wireless communications system 100 that supports quasi co-location prioritization for wireless communications systems in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. In various examples, a network entity 105 may be referred to as a network element, a base station, a mobility element, a radio access network (RAN) node, or network equipment, among other nomenclature. In some examples, network entities 105 and the UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or the network entities 105 as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130) In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to DUs 165 or RUs 170, and the DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

The DUs 165 or one or more RUs 170 may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support phase tracking reference signals and demodulation reference signals for joint channel estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some aspects, a UE 115 of the wireless communications system 100 may be configured (e.g., via radio resource control (RRC) signaling) with up to three CORESETS within a given BWP of a serving cell (e.g., within a given BWP of a component carrier). In some cases (e.g., Release 16), a UE 115 may be configured with up to five CORESETs in a BWP of a serving cell. A CORESET may be associated with one or more transmission configuration indicator (TCI) states for PDCCH repetition, and may be associated with a quantity of resource blocks (RBs) in the frequency domain, and a quantity of symbols or other TTI in the time domain (e.g., quantity of 1/2/3 OFDM symbols), each of which may be configured (e.g., via RRC signaling). Moreover, each CORESET may be associated with one active TCI state. In some aspects, a CORESET configured at the UE 115 may be associated with a control channel element (CCE) resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with one CORESET, and may include a set of monitoring occasions. In some aspects, a search space set may include a set of control channel monitoring occasions. For example, a search space set may include a set of monitoring occasions, with a monitoring occasion occurring at regular or irregular periodicities (e.g., monitoring occasion every 10 ms). The UE 115 may be configured to blindly decode signals received in the respective monitoring occasions to determine whether cyclic redundancy check (CRC) passes in the respective monitoring occasions. Moreover, a UE 115 may be configured to determine the control channel monitoring occasions associated with a given search space set based on one or more characteristics of the search space set which may be configured (e.g., pre-configured) at the UE 115, indicated to the UE 115 via a network entity 105 (e.g., via RRC signaling), or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s < k_s$), or any combination thereof. A UE 115 of the wireless communications system 100 may determine a number/quantity of PDCCH monitoring occasions (e.g., PDCCH candidates) within a slot $\eta_{s,f}^\mu$ and a frame $\eta_f$ if $\eta_f N_{slot}^{frame,\mu} + \eta_{s,f}^\mu o_s \mod k_s = 0$. In some aspects, when monitoring a control channel, a UE 115 may be configured to monitor control channel candidates (e.g., PDCCH candidates) for a search space set s for $T_s$ consecutive slots, starting from slot $\eta_{s,f}^\mu$, and may refrain from monitoring control channel candidates for the search space set s for the next $k_s - T_s$ consecutive slots. Quantities of control channel candidates (e.g., PDCCH candidates) may be based on an aggregation level (e.g., number of CCEs) of wireless communications at the UE 115.

These search space set parameters may be configured (e.g., pre-configured) at the UE 115, indicated to the UE 115 via a network entity 105 (e.g., via RRC signaling), or both. For example, RRC signaling may be used to configure parameters of a search space set at a UE 115, including with which CORESET the search space set is associated, a periodicity of monitoring occasions of the search space set, an offset of the monitoring occasions, DCI formats to monitor, a number of PDCCH candidates for a given aggregation level of the search space set, and the like.

Each search space set may be associated with a search space set index. In some implementations, PDCCH candidates may be defined as part of the search space set configuration. For example, a search space set include a set of PDCCH candidates, where each PDCCH candidate is associated with a given aggregation level and candidate index. In some aspects, a UE 115 may be configured to monitor PDCCH candidates in configured search space sets. The UE 115 may be configured to blindly decode the PDCCH candidates (e.g., monitoring occasions) within one or more search space sets. In cases where the UE 115 receive a DCI message within a PDCCH candidate, the UE 115 may identify a CRC pass for one or more of the candidates (e.g., successfully decoding), and the UE 115 may act in accordance with the received DCI message (e.g., perform a communication scheduled by the DCI message).

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol(s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions (e.g., PDCCH candidates) within each slot that the search space set exists. Moreover, the UE 115 may be configured to determine that the three monitoring occasions begin at the second, seventh, and eleventh symbols of each respective slot that the search space exists.

In some aspects, multiple search space sets and/or multiple PDCCH candidates may be linked together in different search space sets (e.g., associated with one another) for possible repetitions of the same control channel transmission (e.g., repetitions of DCI). PDCCH candidates which are linked together may be used to transmit/receive repetitions of the same control message. In other words, PDCCH candidates may be linked together for "PDCCH repetitions." In the context of PDCCH repetitions, the payload (e.g., DCI payload) received within two PDCCH candidates (e.g., two PDCCH repetitions) may be the same. For example, a first PDCCH candidate may be related to, or linked with, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally or alternatively, the UE 115 may receive and/or decode both the first and second repetitions of DCI by performing soft-combining of the first and second repetitions of DCI, and the UE may be aware of the linking before decoding. In some aspects, related/linked PDCCH candidates may have the same aggregation level (e.g., same number of CCEs). In some cases, PDCCH candidates with the same aggregation level and same candidate index in the two linked search space sets may be linked, where the two linked search space sets may be configured with the same number of candidates for each aggregation level.

In some wireless communications systems which support SFN communications, a single PDCCH transmission (e.g., PDCCH DMRS) may be associated with two TCI states. In particular, for SFN PDCCH transmissions, one CORESET may be activated at UE 115 with two active TCI states. In such cases, each control channel candidate (e.g., PDCCH candidate) of a search space set associated with the CORESET may be associated with the two active TCI states of the CORESET. Moreover, each PDCCH transmission may be associated with two TCI states in all REGs and CCEs of the PDCCH transmission. As compared to linked search space candidates configured for PDCCH repetition, in SFNed PDCCH transmissions (e.g., PDCCH transmissions associated with CORESETs with two or more TCI states), there is no linking between TCI states, as each PDCCH candidate is defined in one search space set and one CORESET.

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In some cases, two search space sets may be linked by RRC configuration. In some cases, the measurement occasions of the two linked search space sets are one-to-one mapped. In some cases, PDCCH candidates with a same start CCE index may be linked. Moreover, UEs 115 may be configured with sets of linked/related PDCCH candidates which are within a same slot or TTI (e.g., intra-slot PDCCH repetition which may be time division multiplexed or time-overlapping), sets of linked/related PDCCH candidates which are in different slots (e.g., intra-slot PDCCH repetition), or both.

The wireless communications system 100 may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., physical downlink shared channel (PDSCH), physical uplink shared channel (PUSCH)) on a different component carrier (e.g., scheduling component carrier, scheduling cell). Conversely, intra-carrier scheduling, or self-scheduling, refers to cases in which control signaling transmitted/received on a component carrier is used to schedule communications on the same component carrier (e.g., same cell).

In some aspects, a search space set may include control channel candidates (e.g., PDCCH candidates) which are configured for self-scheduling, cross-carrier scheduling, or both. The CCEs associated with control channel candidates for different scheduled component carriers (e.g., PDCCH candidates for self-scheduling, PDCCH candidates for cross-carrier scheduling) within a monitoring occasion of a search space set may be separately identified based on a number of candidates for each aggregation level. The number/quantity of candidates for each aggregation level may be configured in a scheduled component carrier, and may be monitored in the scheduling component carrier. For example, a monitoring occasion for a search space set includes a set of PDCCH candidates with an aggregation level of two (e.g., two CCEs for each PDCCH candidate). In this example, the set of PDCCH candidates may include a first subset of PDCCH candidates configured for self-scheduling (e.g., subset of PDCCH candidates with CIF=0), and a second subset of PDCCH candidates for cross-carrier scheduling (e.g., subset of PDCCH candidates with CIF=1). In this regard, a single search space set may include PDCCH candidates which are configured for self-scheduling, cross-carrier scheduling, or both.

As noted herein, in some wireless communications systems, downlink control messages (e.g., DCI messages) may schedule communication of other downlink messages (e.g., PDSCH messages) from a network entity 105 to a UE 115. The UE 115 may be configured to determine what QCL assumption (e.g., QCL parameters or QCL type properties, beam parameters, transmission configuration indicator (TCI) state, and the like) is to be used for receiving the scheduled downlink PDSCH message based on the downlink control message. For example, the QCL assumption used for receiving the downlink control message may also be used for the scheduled downlink PDSCH message or another QCL assumption may be used.

In some cases, the UE 115 may monitor one or more CORESETs for multiple linked control channel candidates (e.g., PDCCH candidates). That is, the control channel candidates may be linked for multiple repetitions of the same downlink control message. For example, a same DCI payload may be transmitted via two (or more) PDCCH candidates in a slot (e.g., the PDCCH candidates may overlap in time). In some examples, each of the control channel candidates may be associated with one or more QCL assumptions. Additionally or alternatively, the scheduled PDSCH may be associated with one or more QCL assumptions. However, some wireless communications systems may not provide a UE 115 with a mechanism for determining which QCL assumptions should be used for monitoring or receiving one or more CORESETs, a shared data channel, or both.

Accordingly, the techniques described herein may enable devices in a wireless communications system to implement one or more priority rules for allocating receive beams for various communications. For example, a UE 115 may receive control signaling indicating that the UE 115 is to monitor one or more CORESETs. Additionally, the UE 115 may receive a control message scheduling a downlink message (e.g., a PDSCH message). In some examples, the downlink message may overlap in time with the one or more control resource sets. The UE 115 may monitor the downlink message (e.g., the shared data channel), the one or more CORESETs, or a combination thereof in accordance with a priority rule. The priority rule may indicate which QCL assumptions for the UE 115 to use for monitoring the control resource sets, the downlink message, or both.

In some examples, the downlink message may correspond to one or more TCI states. The priority rule may indicate which QCL assumptions the UE 115 should use to monitor the one or more CORESETs in addition or alternative to the downlink message. As an illustrative example, the UE 115 may be capable of reception via two beams (e.g., the UE 115 may implement up to two QCL assumptions for monitoring or receiving communications). The UE 115 may be indicated to monitor one or more CORESETs associated with one or more QCL assumptions (e.g., a single CORESET associated with one or more QCL assumptions, two CORESETs each associated with a respective QCL assumption, and so on). Further, the UE 115 may be indicated to monitor the downlink message associated with a TCI. In other words, the UE 115 may be capable of reception using up to two QCL assumptions but may be indicated to monitor the CORESETs and downlink message using one, two, three, or four QCL assumptions in a same time period (e.g., in a slot). Thus, the UE 115 may identify the QCL assumptions for monitoring (or refraining from monitoring) the CORESETs and downlink message based on the one or more priority rules indicating the QCL assumptions for a respective scenario. For example, a priority rule may indicate the QCL assumptions to use when the downlink message corresponds to one or more different QCL assumptions as the one or more CORESETs, when the downlink message corresponds to one or more of the same QCL assumptions as the one or more CORESETs, or any combination thereof, among other examples described herein. By implementing such priority rules, the UE 115 may efficiently allocate receive beams to receive the various communications (e.g., CORESETs, downlink messages, or both), which may result in improved communications efficiency, reliability, or both. For example, such priority rules may enable the UE 115 to prioritize CORESETs (e.g., improve PDCCH reliability or throughput), efficiently use beams to receive multiple CORESETs/PDSCHs, or any combination thereof, among other examples of potential benefits.

Figure 2:
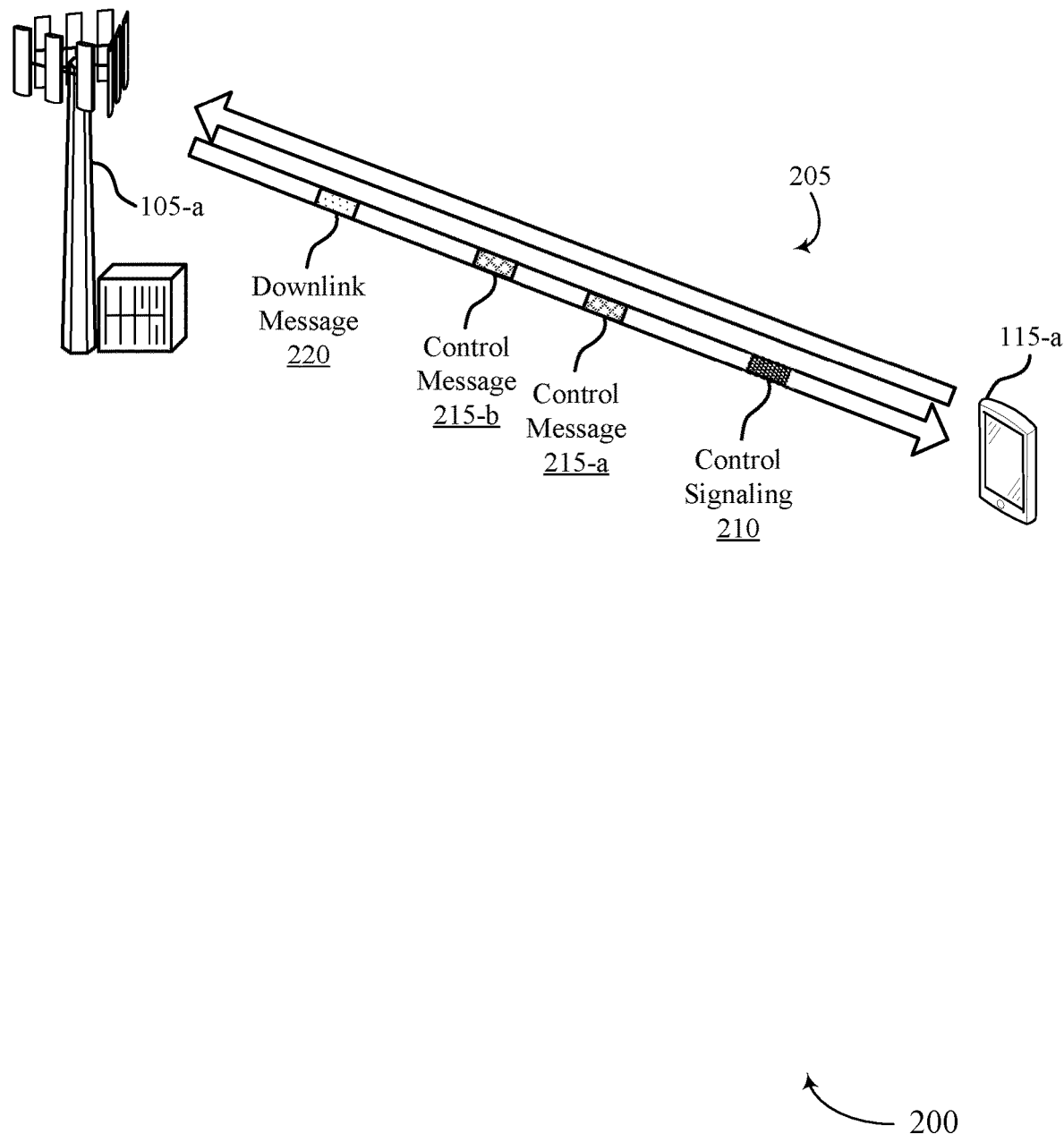
FIG. 2 illustrates an example of a wireless communications system that supports quasi co-location prioritization for wireless communications systems in accordance with aspects of the present disclosure.

FIG. 2 illustrates an example of a wireless communications system 200 that supports quasi co-location prioritization for wireless communications systems in accordance with aspects of the present disclosure. In some examples, wireless communications system 200 may implement, or be implemented by, aspects of wireless communications system 100. For example, the wireless communications system 200 may include a UE 115-*a* and a network entity 105-*a*, which may be examples of the corresponding devices described herein with reference to FIG. 1.

The UE 115-*a* may communicate with the network entity 105-*a* using a communication link 205, which may be an example of an NR or LTE link between the UE 115-*a* and the network entity 105-*a*. In some cases, the communication link 205 between the UE 115-*a* and the network entity 105-*a* may include an example of an access link (e.g., Uu link) which may include a bi-directional link that enables both uplink and downlink communication. For example, the UE 115-*a* may transmit uplink signals, such as uplink control signals or uplink data signals, to the network entity 105-*a* using the communication link 205 and the network entity 105-*a* may transmit downlink signals, such as downlink control signals or downlink data signals, to the UE 115-*a* using the communication link 205.

Figure 3:
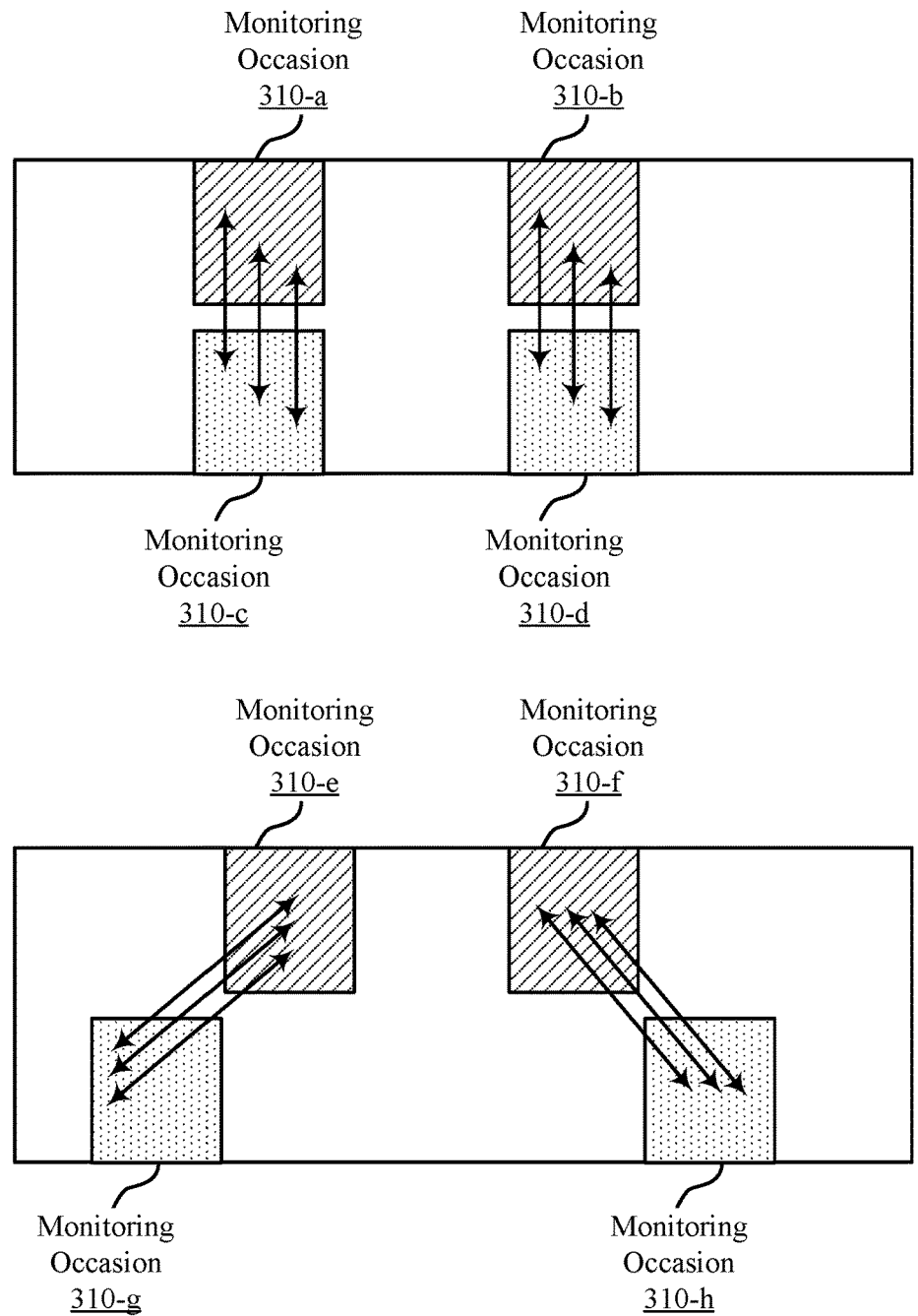
FIG. 3 illustrates an example of a resource configuration that supports quasi co-location prioritization for wireless communications systems in accordance with aspects of the present disclosure.

In some examples, the UE 115-*a* and the network entity 105-*b* of the wireless communications system 200 may support techniques for scheduling communications (e.g., downlink messages 220) at the UE 115-*a* using control channel repetition (e.g., PDCCH repetition) as described herein with reference to FIG. 3. For example, the network entity 105-*b* may send a control message 315-*a* and a control message 315-*b* including a same DCI payload scheduling the downlink message 320. By implementing such repetition (e.g., transmitting two PDCCH candidates on different resources that may be TDM or time overlapping or frequency overlapping or any combination thereof), the wireless communications system 200 may realize improved communications reliability, robustness, etc.

In some examples, the wireless communications system 200 may support multiple QCL assumptions (e.g., QCL parameters, QCL properties, QCL type D properties or properties of other QCL types, and the like). For example, the wireless communications system 200 may support multiple QCL-TypeD properties. In some examples, the UE 115-*a* may not receive multiple beams (e.g., different QCL-type D properties) simultaneously in a respective serving cell or on multiple serving cells in a same frequency band with carrier aggregation (CA) operation. For example, the UE 115-*a* may be configured with a priority rule (e.g., pre-configured, signaled via control signaling, and the like). The priority rule may indicate that if a UE 115-*a* is configured for single cell operation or for operation with CA in a same frequency band, and the UE 115-*a* monitors PDCCH candidates in overlapping PDCCH monitoring occasions in multiple CORESETs that have same or different QCL-TypeD properties on active DL BWP of a cell from the one or more cells, then the UE may 115-*a* may monitor PDCCHs in a CORESET, and in any other CORESET from the multiple CORESETs having same QCL-TypeD properties as the CORESET, on the active downlink BWP of a cell from the one or more cells. The CORESET may correspond to the common search space (CSS) set with the lowest index in the cell with the lowest index containing CSS, if any, otherwise to the UE specific search space (USS) set with the lowest index in the cell with lowest index. The lowest USS set index may be determined over all USS sets with at least one PDCCH candidate in overlapping PDCCH monitoring occasions. Although an example of a priority rule is given above, the priority rule may be configured for any of the rules, scenarios, schemes, QCL assumption prioritizations, or any combination thereof as described herein.

In some examples, for PDCCH and PDSCH, if a QCL-typeD of a PDSCH DMRS is different from that of the PDCCH DMRS with which they overlap in at least one symbol, the UE 115-*a* may be expected to prioritize the reception of PDCCH associated with that CORESET. This may also apply to the intra-band CA case (e.g., when PDSCH and the CORESET are in different component carriers). In some examples, such a rule may be defined for the case that the offset between the reception of the downlink DCI (e.g., scheduling DCI) and the scheduled PDSCH is less than or equal to a threshold (e.g., timeDurationForQCL).

In some examples, the wireless communications system 200 may support SFN communications. For example, the network entity 105-*a* may simultaneously transmit a same PDCCH from multiple TRPs (e.g., two TRPs) on the same time and frequency resources. Stated alternatively, the wireless communications system 200 may support a scheme of PDCCH transmission from multiple TRPs based on SFN transmission. Such SFN communications may improve a reliability of control messaging (e.g., a PDCCH message may realize improved reliability in high mobility situations such as high speed train scenarios, high blockage scenarios, and the like). In some examples, a CORESET for SFN communications may be RRC configured with a higher layer parameter to indicate that DCI or PDCCH received on this CORESET is SFN communications. Additionally or alternatively, the UE 115-a may receive other configuration messages such as a MAC-CE activation command to indicate two TCI states for a CORESET. In some examples, a single CORESET may be configured with two active TCI states (e.g., all PDCCH candidates in a given search space (SS) set may be associated with both TCI states of the CORESET).

In some examples, the wireless communications system 200 may support reception via multiple beams at the UE 115-a. For example, the UE 115-a may be configured with two different beams to monitor overlapping CORESETs. In such examples, the UE 115-a may support identifying two QCL assumptions (e.g., two QCL-TypeD properties) for multiple overlapping CORESETs. In other words, the wireless communications system 200 may schedule or configure communications such that overlapping PDCCHs may have different QCL assumptions (e.g., QCL typeD properties or properties of other QCL types) for time overlapping PDCCH repetition or with a CORESET with two QCL assumptions (e.g., for SFN PDCCH). However, in some cases the UE 115-a may not have with a mechanism for determining which QCL assumptions (e.g., two QCL assumptions) should be used for monitoring or receiving one or more CORESETs associated with multiple QCL assumptions, a shared data channel associated with one or more QCL assumptions, or any combination thereof (e.g., the one or more CORESETs and the shared data channel may overlap in time).

Accordingly, aspects of the present disclosure provide techniques that enable devices in the wireless communications system 200 to implement one or more priority rules for allocating receive beams for various communications. For example, the UE 115-a may receive control signaling 210 indicating that the UE 115-a is to monitor one or more CORESETs. Additionally, the UE 115-a may receive a control message 215-a or control message 215-b or both scheduling a downlink message 220 (e.g., a PDSCH message). In some examples, the downlink message 220 may overlap in time with the one or more CORESETs. The UE 115-a may monitor the downlink message 220 (e.g., the shared data channel), the one or more CORESETs, or a combination thereof in accordance with a priority rule. The priority rule may indicate which QCL assumptions for the UE 115-a to use for monitoring the control resource sets, the downlink message, or both.

In some examples, the downlink message 220 may correspond to a single TCI state. In such examples, the UE 115-a may identify QCL assumptions for monitoring the various communications based on the priority rule indicating the QCL assumptions for a respective scenario. Additionally or alternatively, the downlink message 220 may correspond to multiple (e.g., two) TCI states. For example, the multiple TCI states may be applied in spatial division multiplexing (SDM) (e.g., to different layers), FDM (e.g., to different resource blocks (RBs), TDM (e.g., to different symbols), or any combination thereof. In some examples, a PDSCH having two TCI states may correspond to a single DCI based multi-TRP feature as described herein, where each TCI codepoint of DCI indicates one or two TCI states (e.g., when it indicates two TCI states, the PDSCH may have two TCI states based on SDM, FDM, or TDM schemes). Additionally or alternatively, the downlink message 220 may be an example of a SFN PDSCH where each DMRS port and data layer may be associated with two TCI states (e.g., similar to a SFN PDCCH). In some examples, an offset between the reception of a downlink DCI (e.g., a scheduling DCI) and the scheduled PDSCH may be less than a threshold (e.g., a threshold timeDurationForQCL). The UE 115-a may identify one or more default beams based on the offset being less than the threshold, the one or more priority rules, or a combination thereof. For example, the UE 115-a may identify two default beams as the two TCI states corresponding to the lowest TCI codepoint that is mapped to the two TCI states (e.g., in the case when the UE 115-a is configured with a parameter enable TwoDefaultTCI-States).

The UE 115-a may identify the QCL assumptions for monitoring (or refraining from monitoring) the CORESETs and downlink message 220 based on the one or more priority rules indicating the QCL assumptions for a respective scenario. For example, a priority rule may indicate the QCL assumptions to use when the downlink message 220 corresponds to one or more different QCL assumptions as the one or more CORESETs, when the downlink message corresponds to one or more of the same QCL assumptions as the one or more CORESETs, or any combination thereof, among other examples described herein with reference to FIGS. 4 and 5. By implementing such priority rules, the UE 115-a may efficiently allocate receive beams to receive the various communications (e.g., CORESETs, downlink messages 220, or both), which may result in improved communications efficiency, reliability, or both, among other potential benefits.

FIG. 3 illustrates an example of a resource configuration 300 that supports quasi co-location prioritization for wireless communications systems in accordance with aspects of the present disclosure. Aspects of the resource configuration 300 may implement, or be implemented by, wireless communications systems 100, 200, or both.

As noted previously herein, multiple search space sets 305 may be linked together for control channel repetition (e.g., PDCCH repetition). For example, as shown in the resource configuration 300, a first search space set 305-a may be linked to a second search space set 305-b. In particular, monitoring occasions 310 associated with the first search space set 305-a (e.g., monitoring occasions 310-a, 310-b, 310-e, 310-f) may be linked with monitoring occasions 310 associated with the second search space set 305-b (e.g., monitoring occasions 310-c, 310-d, 310-g, 310-h). In some aspects, related PDCCH candidates in the respective search space sets 305 (e.g., PDCCH candidates within the monitoring occasions 310 of the respective search space sets 305) which are associated with corresponding CORESETs may be linked together (e.g., related) for PDCCH repetition. In other words, linked search space sets (e.g., search space sets 305-a, 305-b) may be associated with corresponding CORESETs (e.g., first CORESET, second CORESET, respectively). Moreover, the respective CORESETs corresponding to the respective search space sets 305-a, 305-b may be configured/activated with different TCI states (e.g., each CORESET may be activated with one or two TCI states).

In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both. As an illustrative example of PDCCH repetition, each repetition may be a PDCCH candidate and two PDCCH candidates may be linked together for repetition of the same DCI. The two linked PDCCH candidates may be in different search space sets 305 (e.g., the two search space sets 305-*a* and 305-*b* may be associated with corresponding CORESETs and the two or more CORESETs may be configured or activated with different TCI states).

Associations (e.g., links) between search space sets 305 and/or between PDCCH candidates may be configured (e.g., pre-configured) at the UE 115, signaled to the UE 115 by the network entity 105 (e.g., via RRC signaling), or both. For example, a UE 115 may receive an RRC message which indicates that a first PDCCH candidate in the first search space set 305-*a* is linked with (e.g., related to) a second PDCCH candidate in the second search space set 305-*b*. By way of another example, a UE 115 may receive an RRC message which indicates that the first search space set 305-*a* is linked with (e.g., related to) a second search space set 305-*b* for PDCCH repetition. In this example, PDCCH candidates with the same aggregation level and same candidate index between the first and second search space sets 305 may be linked. In particular, the first search space set 305-*a* and the second search space set 305-*b* may include a first set of PDCCH candidates (first set of monitoring occasions 310) and a second set of PDCCH candidates (second set of monitoring occasions 310), respectively, where the first set of PDCCH candidates are linked to the second set of PDCCH candidates.

In some cases, the first and second sets of monitoring occasions 310 may include the same quantity of monitoring occasions/PDCCH candidates (e.g., one-to-one mapping of monitoring occasions). For example, the monitoring occasion 310-*a* associated with the first search space set 305-*a* may include the same quantities of PDCCH candidates as the monitoring occasion 310-*c* associated with the second search space set 305-*b*. Similarly, the monitoring occasions 310-*b*, 310-*e*, and 310-*f* associated with the first search space set may include the same quantities of PDCCH candidates as the monitoring occasions 310-*d*, 310-*g*, and 310-*h* associated with the second search space set 305-*b*, respectively. Moreover, the first and second search space 305-*a*, 305-*b* sets may be configured with the same quantity of PDCCH candidates for each aggregation level.

In some examples, aspects of the resource configuration 300 may support techniques for control channel repetition (e.g., PDCCH repetition) in the context of SFN communications, which may enable communications (e.g., PDSCH transmissions) to be scheduled at a UE 115 via control signaling transmitted/received on linked search space sets of a scheduling component carrier. In particular, aspects of the resource configuration 300 may enable UEs 115 to determine TCI state(s) for scheduled downlink messages in cases where repetitions of a scheduling downlink control message occur in a set of PDCCH candidates linked across two search space sets 305 (and/or two CORESETs) which are associated with multiple TCI states (e.g., SFN CORESETs).

Figure 4:
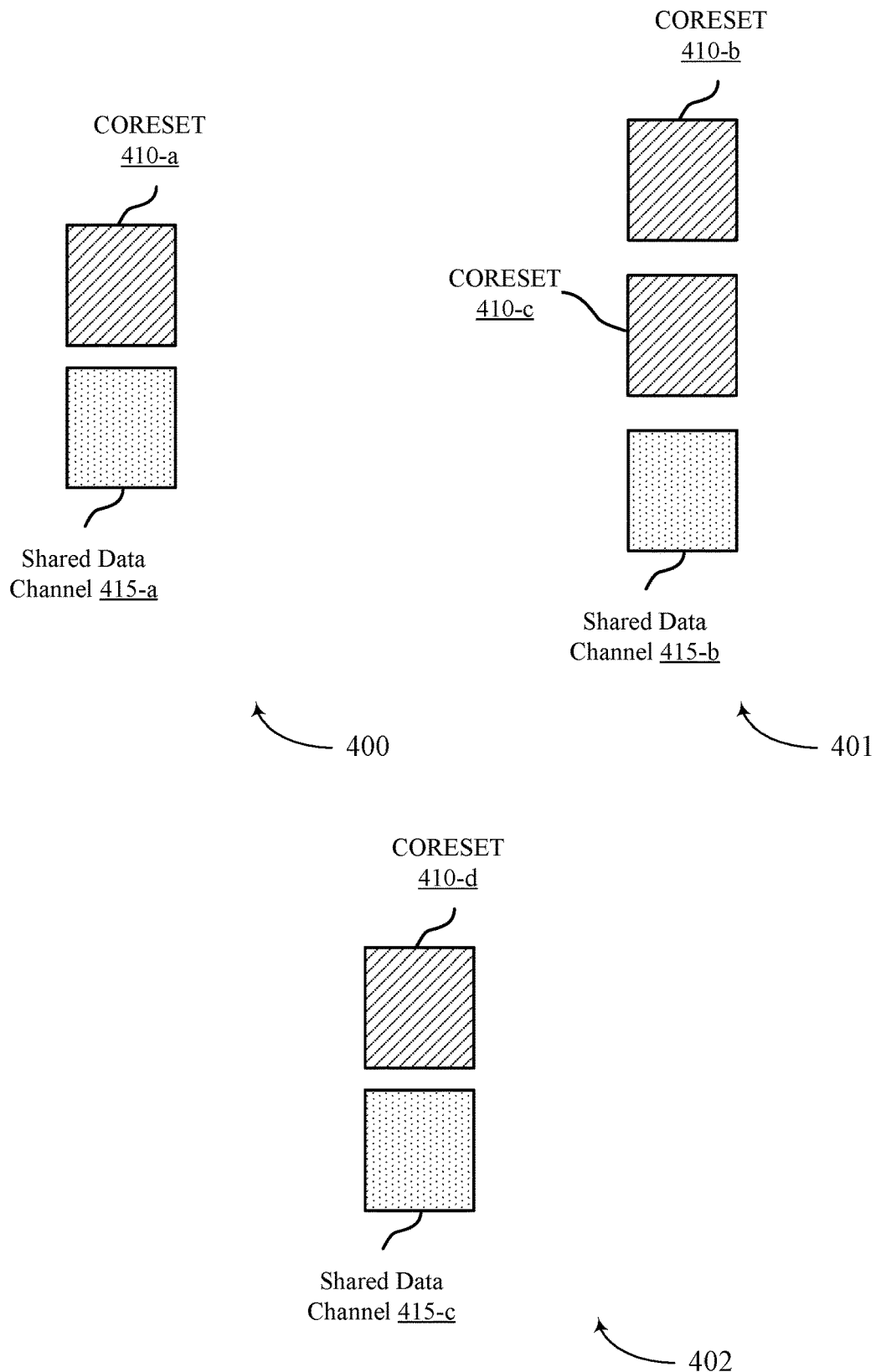
FIGS. 4 and 5 illustrate examples of priority schemes that support quasi co-location prioritization for wireless communications systems in accordance with aspects of the present disclosure.

In some examples, aspects of the resource configuration 300 may support one or more priority rules for allocating receive beams for various communications as described herein. For example, a UE may receive control signaling indicating to monitor one or more CORESETs associated with the search space sets 305. The UE may receive a control message scheduling a downlink message (e.g., a shared data channel message). In some examples, the downlink message may overlap in time with the one or more CORESETs. The UE may monitor the downlink message (e.g., the shared data channel), the one or more CORESETs, or a combination thereof in accordance with a priority rule. The priority rule may indicate which QCL properties to use for monitoring the control resource sets, the downlink message, or both. By implementing such priority rules, the UE may efficiently allocate receive beams to receive the communications, which may result in improved communications efficiency, reliability, or both FIG. 4 illustrates examples of priority schemes 400, 401, and 402 that support quasi co-location prioritization for wireless communications systems in accordance with aspects of the present disclosure. The priority schemes 400, 401, and 402 may implement, or be implemented by, aspects of the wireless communications systems 100 and 200, the resource configuration 300, or any combination thereof. For example, the priority schemes 400, 401, and 402 may illustrate examples of CORESETs 410 and shared data channel 415 communications between a UE a network entity as described herein.

A UE may receive control signaling indicating that the UE is to monitor one or more CORESETs 410. Additionally or alternatively, the UE may receive a control message scheduling a downlink message (e.g., a PDSCH message on the shared data channel 415 resources). In some examples, the downlink message may overlap in time with the one or more CORESETs 410. For example, a scheduled shared data channel 415 may be included in a same period of time (e.g., slot) as one or more CORESETs 410.

The UE may monitor for the downlink message (e.g., a shared data channel 415), the one or more CORESETs 410, or a combination thereof in accordance with one or more priority rules. A priority rule may indicate which QCL assumptions for the UE to use for monitoring the control resource sets, the downlink message, or both. In some examples, the UE may be pre-configured with the one or more priority rules. Additionally or alternatively, the UE may receive control signaling configuring the one or more priority rules.

As an illustrative example, the priority schemes 400, 401, and 402 may illustrate example scenarios or cases where a UE is capable of reception via two different beams, and the downlink message is associated with a single TCI state (e.g., a PDSCH with one QCL type-D assumption) and overlaps with various CORESETs 410, although it is to be understood the techniques described herein may be applied to any quantity of beams, monitoring occasions, TCI states, etc.

In the example priority scheme 400, the UE may be indicated to monitor one or more CORESETs 410 and a PDSCH message. For example, the UE may be indicated to monitor the CORESET 410-*a* associated with a first QCL assumption and the shared data channel 415-*a* associated with a second QCL assumption. In some examples, the first QCL assumption of the CORESET 410-*a* may be different than the second QCL assumption of the shared data channel 415-*a*. For example, the CORESET 410-*a* may have a first set of QCL-TypeD parameters (e.g., QCL-TypeD "x") and the shared data channel 415-*a* may have a different second set of QCL-TypeD parameters (e.g., QCL-TypeD "y"). Although shown as a single CORESET 410-*a* associated with the first QCL assumption for illustrative clarity, any quantity of CORESETs 410 associated with the first QCL assumption may be used.

In some examples, the UE may prioritize the reception of PDCCH in the one or more CORESETs 410. For example, the UE may allocate the two receive beams (e.g., apply QCL parameters) to monitor the CORESET 410-*a*. Stated alternatively, each beam may use the first QCL assumption for the one or more CORESETs 410 based on a priority rule indicating that the UE is to apply the first QCL assumption to both beams for receiving the CORESETs 410 (e.g., the CORESET 410-*a*) when the CORESETs have a different QCL assumption than the shared data channel 415-*a*. In such examples, the UE may refrain from monitoring the shared data channel 415-*a* (e.g., the UE may not allocate a beam for the shared data channel 415-*a* based on the priority rule indicating to use both beams for the CORESET 410-*a*). Such a priority rule (e.g., the prioritization of the CORESET 410-*a*) may improve reliability of a PDCCH message.

In some other examples, the UE may receive the PDCCH in the one or more CORESETs 410 in addition to the PDSCH with the different QCL assumption. For example, the UE may allocate a first beam with the first QCL assumption to monitor the CORESET 410-*a* and allocate a second beam with the second QCL assumption to receive the shared data channel 415-*a* (e.g., the UE may be capable of receiving with two QCL-TypeD, i.e., 2 receive beams). Stated alternatively, the UE may allocate the first beam (e.g., the first QCL assumption) for the one or more CORESETs 410 (e.g., the CORESET 410-*a*) and a second beam (e.g., the second QCL assumption) for the shared data channel 415-*a* based on a priority rule indicating such an allocation when the CORESETs have a different QCL assumption than the shared data channel 415-*a*. Such a priority rule may improve data throughput and enable the UE to receive both the CORESET 410-*a* and the shared data channel 415-*a*.

In the example priority scheme 401, the UE may be indicated to monitor the CORESET 410-*b*, the CORESET 410-*c*, and the shared data channel 415-*b*. As an illustrative example, the UE may be indicated to monitor the CORESET 410-*a* using a first QCL assumption (e.g., a first QCL-typeD "x") and the CORESET 410-*c* using a second QCL assumption (e.g., a second QCL-typeD "y") different than the first QCL assumption. The UE may also be indicated to monitor the shared data channel 415-*b* using a third QCL assumption.

In some examples, the third QCL assumption of the shared data channel 415-*b* may be different than both the first and second QCL assumptions (e.g., the third QCL assumption may be an example of a third QCL-TypeD "z"). In such examples, a priority rule may indicate that the UE is to prioritize the reception of the PDCCH in the CORESET 410-*b* and the CORESET 410-*c*. For example, the UE may allocate a first beam for monitoring the CORESET 410-*b* and the second beam for monitoring the CORESET 410-*c*. In such examples, the UE may not allocate a beam for the shared data channel 415-*b*. Stated alternatively, the priority rule may indicate the UE is to use the first QCL assumption of the CORESET 410-*b* and the second QCL assumption of the CORESET 410-*c* based on the third QCL assumption being different than the first and second QCL assumptions.

In some other examples, the third QCL assumption of the shared data channel 415-*b* may be the same as one of the first or second QCL assumptions (e.g., the third QCL assumption may be an example of a third QCL-TypeD "x" or "y"). In such examples, a priority rule may indicate that the UE is to allocate a first beam to monitor the CORESET 410 and receive the shared data channel 415-*b* with the same QCL assumption and allocate a second beam to monitor the other CORESET 410. For example, the UE may allocate a first beam (e.g., use the first QCL assumption) for monitoring the CORESET 410-*b* and the shared data channel 415-*b*, and the UE may allocate a second beam (e.g., use the second QCL assumption) for monitoring the CORESET 410-*c*. In some of the examples described herein, the UE may monitor the CORESETs 410 (e.g., monitoring time frequency resources to potentially receive downlink control information) and receive the shared data channels 415 (e.g., receive scheduled PDSCH messages), though in some instances the term monitoring used herein may be referred to as receiving, and vice versa.

In the example priority scheme 402, the UE may be indicated to monitor the CORESET 410-*d* and receive the shared data channel 415-*c*. In some examples, the priority scheme 402 may be a similar priority scheme as priority scheme 401, except that the CORESET 410-*d* may be an example of a CORESET associated with two TCI states (e.g., a SFN CORESET 410). As an illustrative example, the UE may be indicated to monitor the CORESET 410-*d* using a first QCL assumption (e.g., a first QCL-typeD "x") and a second QCL assumption (e.g., a second QCL-typeD "y"). The UE may also be indicated to receive the shared data channel 415-*c* using a third QCL assumption.

In some examples, the third QCL assumption of the shared data channel 415-*c* may be different than both the first and second QCL assumptions (e.g., the third QCL assumption may be an example of a third QCL-TypeD "z"). In such examples, a priority rule may indicate that the UE is to prioritize the reception of the PDCCH in the CORESET 410-*d*. For example, the UE may allocate a first beam for monitoring the CORESET 410-*d* and the second beam for monitoring the CORESET 410-*d*. In some such examples, the UE may not allocate a beam for the shared data channel 415-*c*. Stated alternatively, the priority rule may indicate the UE is to use the first QCL assumption and the second QCL assumption of the CORESET 410-*d* based on the third QCL assumption being different than the first and second QCL assumptions.

In some other examples, the third QCL assumption of the shared data channel 415-*c* may be the same as one of the first or second QCL assumptions (e.g., the third QCL assumption may be an example of a third QCL-TypeD "x" or "y"). In such examples, a priority rule may indicate that the UE is to allocate a first beam to monitor the CORESET 410-*d* and receive the shared data channel 415-*c* with the same QCL assumption, and allocate a second beam to also monitor the CORESET 410-*d* with the second different QCL assumption. For example, the UE may allocate a first beam (e.g., use the first QCL assumption) for monitoring the CORESET 410-*d* and receiving the shared data channel 415-*c*, and the UE may also allocate a second beam (e.g., use the second QCL assumption) for monitoring the CORESET 410-*d*.

In some examples of the SFN CORESET 410-*d*, the UE may receive downlink DCI (e.g., scheduling DCI) and the scheduled PDSCH may be less than a threshold (e.g., timeDurationForQCL). Thus, QCL-TypeD of the PDSCH may be based on a default QCL assumption (e.g., provided by higher layers). In some examples, the priority scheme 402 may be applied for intra-band CA (e.g., when the PDSCH and the CORESET 410-*d* are in difference component carriers).

Figure 5:
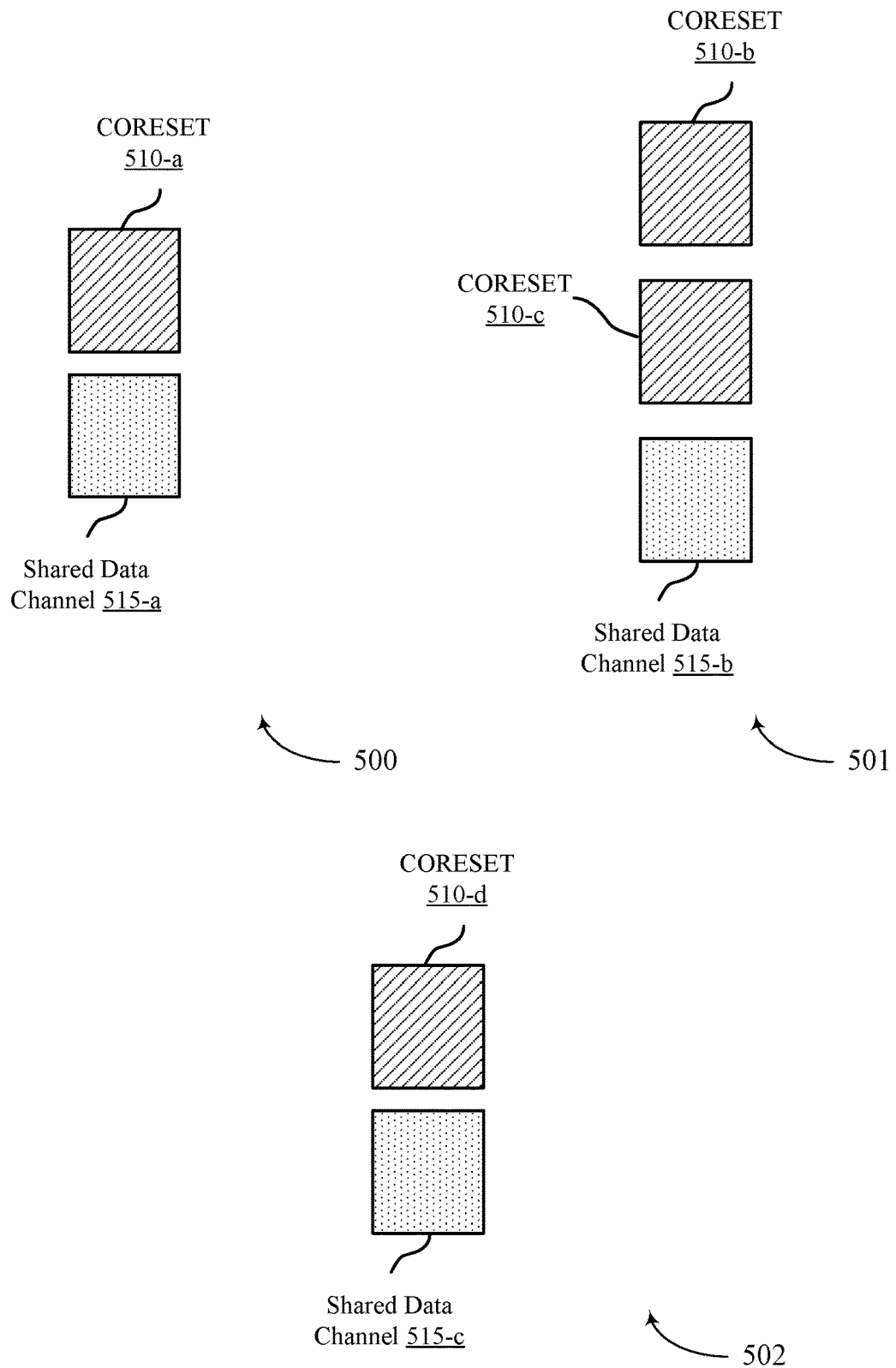

FIG. 5 illustrates example priority schemes 500, 501, and 502 that support quasi co-location prioritization for wireless communications systems in accordance with aspects of the present disclosure. The priority schemes 500, 501, and 502 may implement, or be implemented by, aspects of the wireless communications systems 100 and 200, the resource configuration 300, or any combination thereof. For example, the priority schemes 500, 501, and 502 may illustrate examples of CORESETs 510 and shared data channel 515 communications between a UE a network entity as described herein.

A UE may receive control signaling indicating that the UE is to monitor one or more CORESETs 510. Additionally or alternatively, the UE may receive a control message scheduling a downlink message (e.g., a PDSCH message on the shared data channel 515 resources). In some examples, the downlink message may overlap in time with the one or more CORESETs 510. For example, a scheduled shared data channel 515 may be included in a same period of time (e.g., slot) as one or more CORESETs 510.

The UE may monitor for the downlink message (e.g., a shared data channel 415), the one or more CORESETs 510, or a combination thereof in accordance with one or more priority rules. A priority rule may indicate which QCL assumptions for the UE to use for monitoring the control resource sets, the downlink message, or both. In some examples, the UE may be pre-configured with the one or more priority rules. Additionally or alternatively, the UE may receive control signaling configuring the one or more priority rules.

As an illustrative example, the priority schemes 500, 501, and 502 may illustrate example scenarios or cases where a UE is capable of reception via two different beams, and the downlink message is associated with two TCI states (e.g., a PDSCH with two QCL type-D assumptions) and overlaps with various CORESETs 510, although it is to be understood the techniques described herein may be applied to any quantity of beams, monitoring occasions, TCI states, etc.

In the example priority scheme 500, the UE may be indicated to monitor one or more CORESETs 510 and a PDSCH message. For example, the UE may be indicated to monitor the CORESET 510-a associated with a first QCL assumption and receive the shared data channel 515-a associated with a second QCL assumption and a third QCL assumption. That is, the CORESET 510-a may correspond to a first set of QCL-TypeD parameters (e.g., QCL-TypeD "x") and the shared data channel 515-a may correspond to a second set of QCL-TypeD parameters and a third set of QCL-TypeD parameters. Although shown as a single CORESET 510-a associated with the first QCL assumption for illustrative clarity, any quantity of CORESETs 510 associated with the first QCL assumption may be used.

In some examples, the UE may prioritize the reception of PDCCH in the one or more CORESETs 510. For example, the UE may allocate a first beam to monitor the CORESET 510-a (e.g., the UE may monitor the CORESETs 510 with one beam). Stated alternatively, the beam may use the first QCL assumption for the one or more CORESETs 510 based on a priority rule indicating that the UE is to apply the first QCL assumption to at least the first beam for monitoring the CORESETs 510 when the CORESETs have different QCL assumptions than the shared data channel 515-a. For example, the UE may monitor the CORESET 510-a by using the first QCL assumption of the CORESET 510-a for the first beam. In such examples, the UE may refrain from receiving the shared data channel 515-a (e.g., the UE may not allocate a beam for the shared data channel 515-a based on the priority rule indicating to use one or both beams for the CORESET 510-a). Such a priority rule may improve reliability of a PDCCH message.

In some other examples, the UE may receive the PDCCH in the one or more CORESETs 510 in addition to the PDSCH. For example, the second or third QCL assumption of the shared data channel 515-a may be the same as the first QCL assumption of the CORESET 510-a. As an illustrative example, the CORESET 510-a may correspond to QCL-typeD "x" and the shared data channel 515-a may correspond to QCL-typeD "x" and QCL-typeD "y." Thus, the UE may use the first QCL assumption (e.g., QCL-typeD "x") to monitor one or both of the CORESET 510-a and receive the shared data channel 515-a and the second QCL assumption (e.g., QCL-typeD "y") to receive one or both of the CORESET 510-a and the shared data channel 515-a. In some examples, the UE may use a single beam for the shared data channel 515-a (e.g., the PDSCH may effectively become a single-beam PDSCH instead of a multi-TCI state PDSCH in such examples). For example, the priority rule may indicate to use the first QCL assumption to receive the CORESET 510-a, and the second QCL assumption to receive the shared data channel 515-a.

In the example priority scheme 501, the UE may be indicated to monitor the CORESET 510-b, the CORESET 510-c, and the shared data channel 515-b. As an illustrative example, the UE may be indicated to monitor the CORESET 510-a using a first QCL assumption (e.g., a first QCL-typeD "x") and the CORESET 510-c using a second QCL assumption (e.g., a second QCL-typeD "y") different than the first QCL assumption. The UE may also be indicated to monitor the shared data channel 515-b using a third QCL assumption and a fourth QCL assumption, which may each be the same or different from the first and second QCL assumptions.

In some examples, both the third QCL assumption and the fourth QCL assumption of the shared data channel 515-b may be different than both the first QCL assumption and the second QCL assumption. In some such examples, a priority rule may indicate that the UE is to monitor the CORESETs 510 using the first and second QCL assumptions (e.g., prioritize the CORESETs 510). In some other examples, one of the third QCL assumption or the fourth QCL assumption of the shared data channel 515-b may be different than both the first and second QCL assumptions (e.g., the third QCL assumption may be an example of a third QCL-TypeD "x" and the fourth QCL assumption may be an example of a third QCL-TypeD "z"). In some such examples, a priority rule may indicate that the UE is to receive (e.g., monitor) the CORESET 510 and the shared data channel 515-b using the common QCL assumption (e.g., a first beam with QCL TypeD "x" that is the same for the CORESET 510-b and one of the TCI states of the shared data channel 515-b). The priority rule may indicate that the UE is to monitor the other CORESET 510 using the second QCL assumption (e.g., monitor the CORESET 510-c using the QCL TypeD "y"). In some examples, the PDSCH of the shared data channel 515-b may effectively become single-beam. In some other examples, the first QCL assumption of the CORESET 510-b may be the same as the third QCL assumption of the shared data channel 515-b, and the second QCL assumption of the CORESET 510-c may be the same as the fourth QCL assumption of the shared data channel 515-b. In such examples, the UE may use the first and second QCL assumptions to receive the CORESET 510-b, the CORESET 510-c, and both instances of the shared data channel 515-b based on the priority rule indicating such monitoring.

In the example priority scheme 502, the UE may be indicated to monitor the CORESET 510-d and the shared data channel 515-c. In some examples, the priority scheme 502 may be a similar priority scheme as priority scheme 501, except that the CORESET 510-d may be an example of a CORESET associated with two TCI states (e.g., a SFN CORESET 510). As an illustrative example, the UE may be indicated to monitor the CORESET 510-d using a first QCL assumption (e.g., a first QCL-typeD "x") and a second QCL assumption (e.g., a second QCL-typeD "y"). The UE may also be indicated to receive the shared data channel 515-*c* using a third QCL assumption and a fourth QCL assumptions. Thus, anywhere between one and four QCL assumptions may be possible and the UE may use similar priority rules as the priority scheme 501 to efficiently select two QCL assumptions. For example, if each of the QCL assumptions are different, the UE may prioritize the two CORESET 510-*d* QCL assumptions, if one or more of the QCL assumptions are the same the UE may use a same beam to receive both the CORESET 510-*d* and the shared data channel 515-*c*, or any combination thereof.

In some examples, the priority schemes 500, 501, 502 and the associated example priority rules may be conditioned on one or more of the following example factors. For example, the UE may receive downlink DCI (e.g., scheduling DCI) and the scheduled PDSCH may be less than a threshold (e.g., timeDurationForQCL). Thus, the QCL-TypeD of the PDSCH may be based on a default QCL assumption (e.g., provided by higher layers). In some examples, the priority scheme 502 may be applied for intra-band CA (e.g., when the PDSCH and the CORESET 510-*d* are in difference component carriers). In some examples, the UE may be configured with two default beams (e.g., configured with enableTwoDefaultTCI-States) and the two QCL-TypeD of the PDSCH may be based on two TCI states corresponding to the lowest TCI codepoint that is mapped to 2 TCI states.

In some examples, the PDSCH in the priority schemes 500, 501, and 502 (e.g., the shared data channels 515) may be based on one or more multiplexing schemes, such as SDM, SFN, FDM, or TDM schemes for communications between the UE and the network entity. For example, the two QCL assumptions (e.g., QCL-TypeD) may be for different DMRS ports or data layers (e.g., SDM) or for the same DMRS port or data layers in same REs (e.g., SFN), or for different set of RBs (e.g., FDM) or for different sets of OFDM symbols (e.g., TDM), or any combination thereof, among other examples. In some cases, such as for TDM, the UE may alternatively apply aspects of the example priority schemes 400, 401, 402 to the scenarios of FIG. 5. For example, the UE may use priority rules described with reference to FIG. 4 per PDSCH repetition (e.g., even though PDSCH has two QCL-typeD, since different QCL-typeD may be applied to TDMed repetitions, the rules of FIG. 4 may be applied per repetition), and vice versa.

Figure 6:
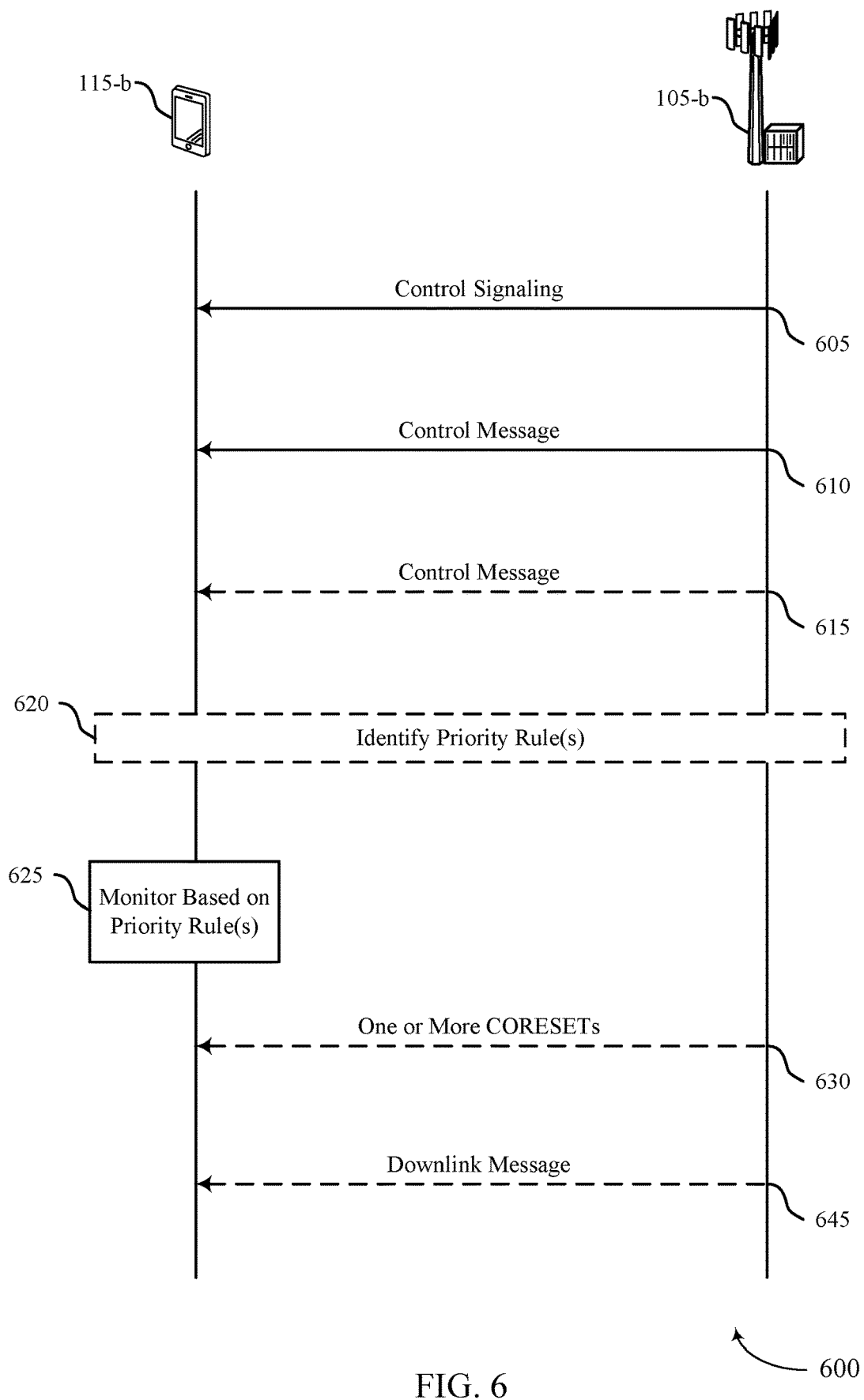
FIG. 6 illustrates an example of a process flow that supports quasi co-location prioritization for wireless communications systems in accordance with aspects of the present disclosure.

FIG. 6 illustrates an example of a process flow 600 that supports quasi co-location prioritization for wireless communications systems in accordance with aspects of the present disclosure. In some examples, process flow 600 may implement, or be implemented by, aspects of wireless communications systems 100 or 200, resource configuration 300, priority schemes as described with reference to FIGS. 4 and 5, or any combination thereof. For example, the process flow 600 may illustrate a UE 115-*b* monitoring one or more CORESETs, a downlink message, or any combination thereof in accordance with one or more priority rules as described with reference to FIGS. 1-5.

In some cases, process flow 600 may include a UE 115-*b* and a network entity 105-*b*, which may be examples of corresponding devices as described herein. In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added. In some examples, operations performed at one device as described herein may additionally or alternatively be performed by other devices, and vice versa.

At 605, the UE 115-*b* may receive, from the network entity 105-*b*, control signaling indicating to the UE to monitor at least one CORESET. For example, the control signaling may be an example of RRC signaling or other control signaling indicating a SFN CORESET with multiple TCI states, a single CORESET corresponding to a respective TCI state, multiple CORESETs each corresponding to a respective TCI state, or any combination thereof. In this regard, the control signaling may configure the UE 115-*b* with multiple CORESETs including sets of PDCCH candidates which the UE 115-*b* is to monitor.

At 610, the UE 115-*b* may receive, from the network entity 105-*b*, a first control message (e.g., first repetition of a control message). In some aspects, the control message may schedule a downlink message (e.g., PDSCH transmission) from the network entity 105-*b* to the UE 115-*b*. The control message may include a DCI message (e.g., DCI formats 0_1, 0_2, 1_1, and/or 1_2) or other examples of control messages. In some examples, the control message may indicate a TCI state for the PDSCH message. In some other examples, the UE 115-*b* may use a default TCI state for the PDSCH message. In some cases, the PDSCH message may correspond to multiple TCI states.

In some examples, at 615 the UE 115-*b* may receive, from the network entity 105-*b*, a second control message (e.g., second repetition of the control message). In some aspects, the second control message may schedule a downlink message from the network entity 105-*b* to the UE 115-*b*. The control message may include a DCI message (e.g., DCI formats 0_1, 0_2, 1_1, and/or 1_2). The first and second control messages (e.g., first and second repetitions of the control message) received at 610 and 615, respectively, may each schedule the same downlink message, and may include the same data payload. In some examples, the UE 115-*b* may perform soft combining of the first and second repetitions of the control message received at 610 and 615. In some aspects, the UE 115-*b* may perform soft combining (e.g., perform one or more soft combining procedures) in order to demodulate/decode the repetitions of the control message. In particular, the UE 115-*b* may perform soft combining of a first signal (e.g., first repetition of the control message) received at 610 with a second signal (e.g., second repetition of the control message) received at 615.

At 620, the UE 115-*b*, the network entity 105-*b*, or both, may identify one or more priority rules for monitoring the at least one CORESET, the downlink message(s), or any combination thereof. For example, based on the priority rules, the UE 115-*b* may monitor one or more of the at least one CORESETs using a first QCL assumption, a second QCL assumption or both. The UE 115-*b* may additionally or alternatively monitor the downlink message (e.g., shared data channel) using the first QCL assumption, the second QCL assumption, a third QCL assumption, or a fourth QCL assumption as described herein with reference to FIGS. 4 and 5, although any configuration or examples of priority rules may be used to configure the UE 115-*b* to select beams (e.g., QCL parameters) for prioritizing the CORESETs and/or or the downlink message. In some examples, the one or more priority rules may be pre-configured at the UE 115-*b*, signaled to the UE 115-*b* via a control signal at 605 (or another control signal), or any combination thereof. Thus, at 625 the UE 115-*b* may monitor in accordance with the identified priority rule(s).

At 630, the network entity 105-*b* may transmit one or more CORESETs to the UE 115-*b*. Additionally, at 645 the network entity 105-*b* may transmit a downlink message to the UE 115-*b*. In some examples, the one or more CORESETs and the downlink message may overlap in time or otherwise share a time duration (e.g., a slot).

Figure 7:
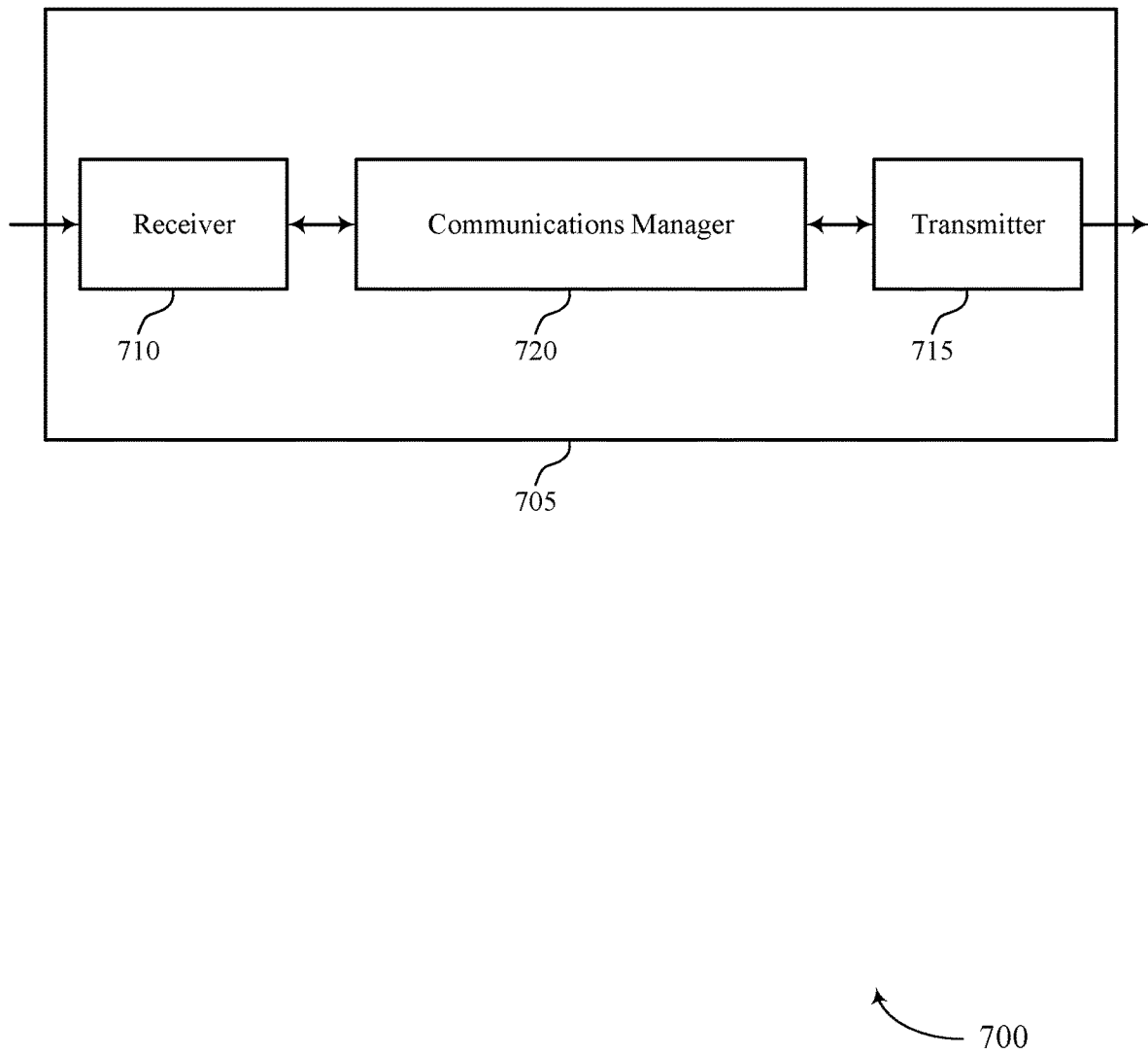
FIGS. 7 and 8 show block diagrams of devices that support quasi co-location prioritization for wireless communications systems in accordance with aspects of the present disclosure.

FIG. 7 shows a block diagram 700 of a device 705 that supports quasi co-location prioritization for wireless communications systems in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to quasi co-location prioritization for wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to quasi co-location prioritization for wireless communications systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of quasi co-location prioritization for wireless communications systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving control signaling indicating to the UE to monitor at least one control resource set. The communications manager 720 may be configured as or otherwise support a means for receiving a control message indicating to the UE to monitor a shared data channel that overlaps in time with the at least one control resource set. The communications manager 720 may be configured as or otherwise support a means for monitoring, via a set of multiple receive beams, the at least one control resource set, the shared data channel, or both, based on a priority rule for allocating the set of multiple receive beams of the UE for monitoring of the at least one control resource set, the shared data channel, or both.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for QCL prioritization as described herein. For example, the device 705 may support priority rules for selecting QCL assumptions for monitoring one or more CORESETs and/or downlink messages, which may enable the device 705 to realize one or more potential advantages at a processor level of the device 705, such as improved communications efficiency, reliability, reduced processing overhead, or a combination thereof, among other possible benefits.

Figure 8:
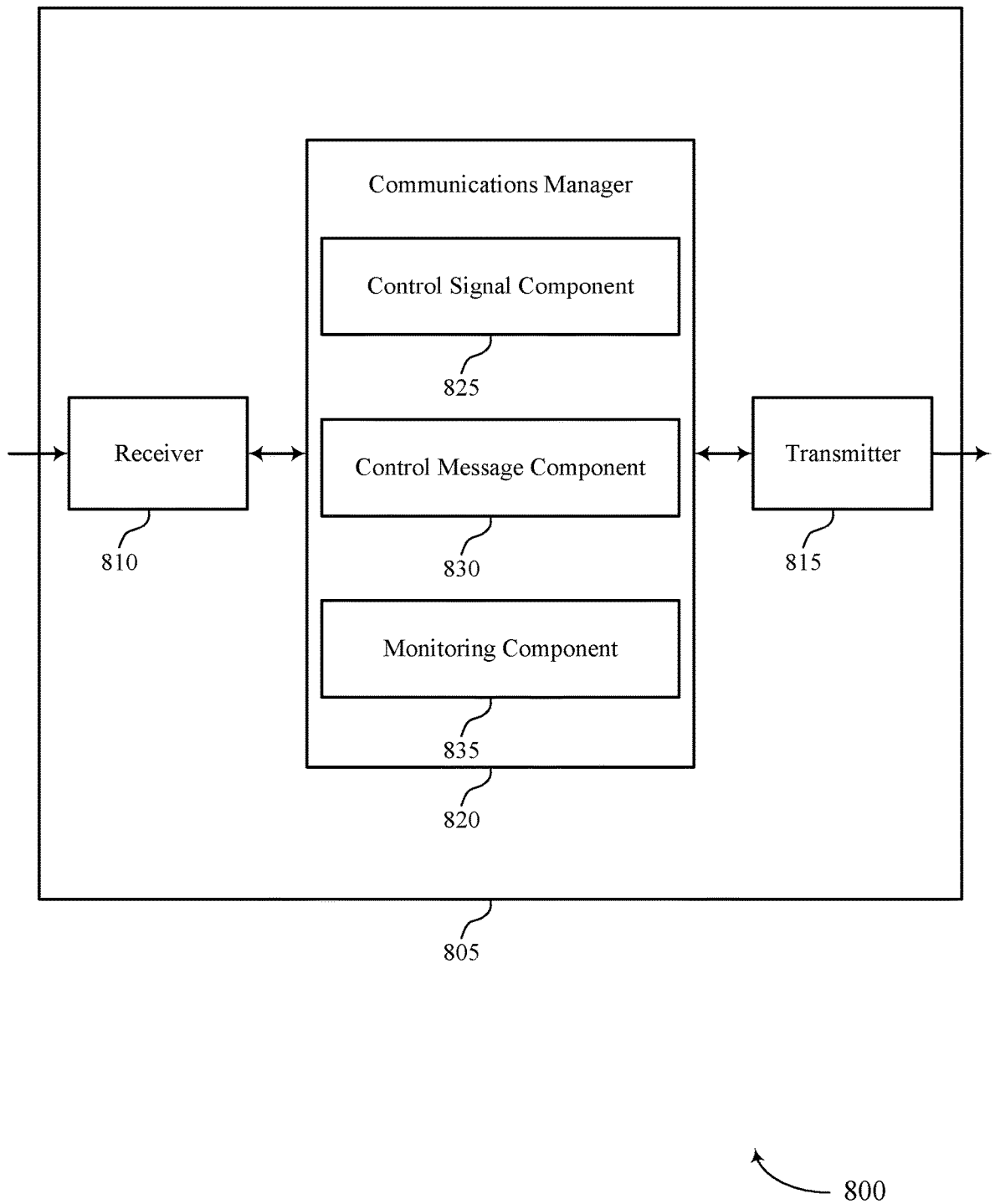

FIG. 8 shows a block diagram 800 of a device 805 that supports quasi co-location prioritization for wireless communications systems in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to quasi co-location prioritization for wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to quasi co-location prioritization for wireless communications systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of quasi co-location prioritization for wireless communications systems as described herein. For example, the communications manager 820 may include a control signal component 825, a control message component 830, a monitoring component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control signal component 825 may be configured as or otherwise support a means for receiving control signaling indicating to the UE to monitor at least one control resource set. The control message component 830 may be configured as or otherwise support a means for receiving a control message indicating to the UE to monitor a shared data channel that overlaps in time with the at least one control resource set. The monitoring component 835 may be configured as or otherwise support a means for monitoring, via a set of multiple receive beams, the at least one control resource set, the shared data channel, or both, based on a priority rule for allocating the set of multiple receive beams of the UE for monitoring of the at least one control resource set, the shared data channel, or both.

Figure 9:
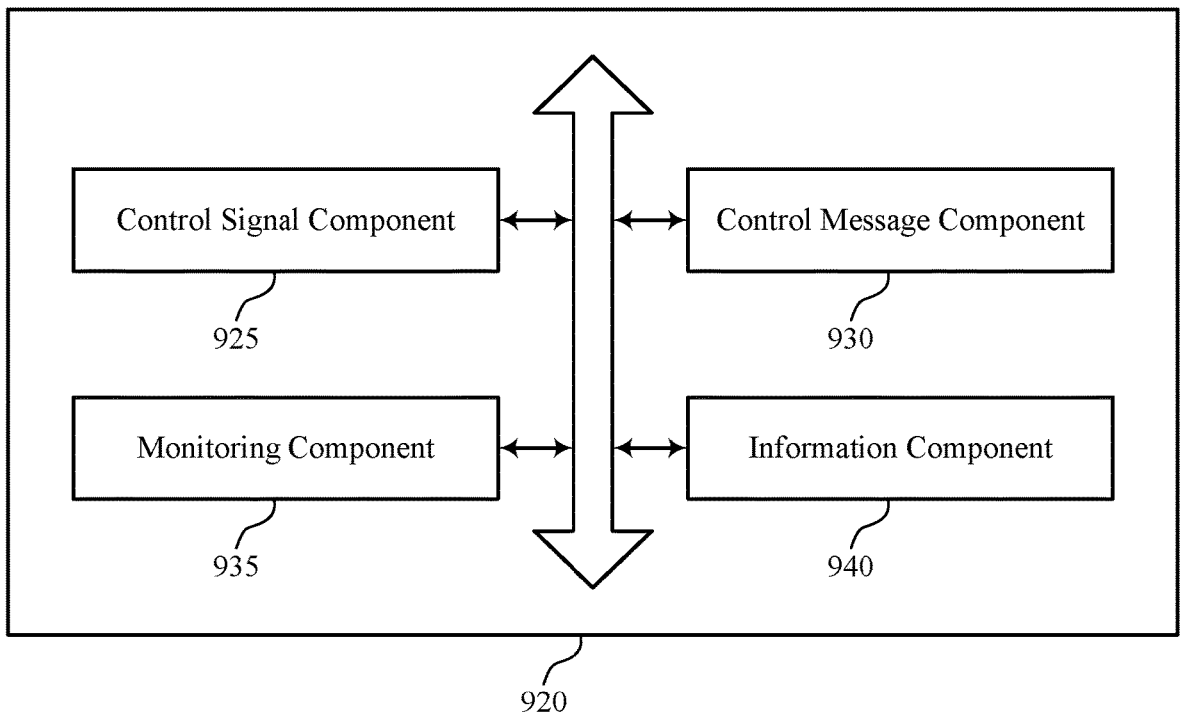
FIG. 9 shows a block diagram of a communications manager that supports quasi co-location prioritization for wireless communications systems in accordance with aspects of the present disclosure.

FIG. 9 shows a block diagram 900 of a communications manager 920 that supports quasi co-location prioritization for wireless communications systems in accordance with aspects of the present disclosure. The communications manager 920 may be an example of aspects of a communications manager 720, a communications manager 820, or both, as described herein. The communications manager 920, or various components thereof, may be an example of means for performing various aspects of quasi co-location prioritization for wireless communications systems as described herein. For example, the communications manager 920 may include a control signal component 925, a control message component 930, a monitoring component 935, an information component 940, or any combination thereof. Each of these components may communicate, directly or indirectly, with one another (e.g., via one or more buses).

The communications manager 920 may support wireless communication at a UE in accordance with examples as disclosed herein. The control signal component 925 may be configured as or otherwise support a means for receiving control signaling indicating to the UE to monitor at least one control resource set. The control message component 930 may be configured as or otherwise support a means for receiving a control message indicating to the UE to monitor a shared data channel that overlaps in time with the at least one control resource set. The monitoring component 935 may be configured as or otherwise support a means for monitoring, via a set of multiple receive beams, the at least one control resource set, the shared data channel, or both, based on a priority rule for allocating the set of multiple receive beams of the UE for monitoring of the at least one control resource set, the shared data channel, or both.

In some examples, to support monitoring, the monitoring component 935 may be configured as or otherwise support a means for monitoring, via the set of multiple receive beams, a set of multiple control resource sets including the at least one control resource set based on the priority rule indicating to monitor the set of multiple control resource sets when each of the set of multiple control resource sets corresponds to a same quasi co-location assumption that differs from a quasi co-location assumption of the shared data channel.

In some examples, the monitoring component 935 may be configured as or otherwise support a means for refraining from monitoring the shared data channel based on each of the set of multiple control resource sets corresponding to the same quasi co-location assumption that differs from the quasi co-location assumption of the shared data channel.

In some examples, to support monitoring, the monitoring component 935 may be configured as or otherwise support a means for monitoring a set of multiple control resource sets including the at least one control resource set via a first beam of the set of multiple receive beams and the shared data channel via a second beam of the set of multiple receive beams based on the priority rule indicating to monitor the set of multiple control resource sets via the first beam when each of the set of multiple control resource sets corresponds to a same quasi co-location assumption that differs from a second quasi co-location assumption of the shared data channel.

In some examples, to support monitoring, the monitoring component 935 may be configured as or otherwise support a means for monitoring, via the set of multiple receive beams, a set of multiple control resource sets including the at least one control resource set based on the priority rule indicating to monitor the set of multiple control resource sets when the set of multiple control resource sets and the shared data channel each correspond to a different respective quasi co-location assumption.

In some examples, to support monitoring, the monitoring component 935 may be configured as or otherwise support a means for monitoring the at least one control resource set of a set of multiple control resource sets via a first beam of the set of multiple receive beams and monitoring the shared data channel and a second control resource set of the set of multiple control resource sets via a second beam of the set of multiple receive beams based on the priority rule indicating to monitor the at least one control resource set via the first beam and to monitor the shared data channel and the second control resource set via the second beam when the second control resource set and the shared data channel correspond to a same quasi co-location assumption.

In some examples, to support monitoring, the monitoring component 935 may be configured as or otherwise support a means for monitoring the single control resource set via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states when the set of multiple transmission configuration indicator states each correspond to a different quasi co-location assumption than the shared data channel.

In some examples, to support monitoring, the monitoring component 935 may be configured as or otherwise support a means for monitoring the single control resource set via a first beam of the set of multiple receive beams associated with a first quasi co-location assumption of the set of multiple quasi co-location assumptions and via a second beam of the set of multiple receive beams associated with a second quasi co-location assumption of the set of multiple quasi co-location assumptions, and monitoring the shared data channel via the second beam, when the single control resource set and the shared data channel correspond to a same quasi co-location assumption.

In some examples, to support monitoring, the monitoring component 935 may be configured as or otherwise support a means for monitoring, via the set of multiple receive beams, a set of multiple control resource sets including the at least one control resource set based on the priority rule indicating to monitor the set of multiple control resource sets when each of the set of multiple control resource sets corresponds to a same quasi co-location assumption that differs from the first quasi co-location assumption and the second quasi co-location assumption of the shared data channel.

In some examples, the monitoring component 935 may be configured as or otherwise support a means for refraining from monitoring the shared data channel based on each of the set of multiple control resource sets corresponding to the same quasi co-location assumption that differs from the first quasi co-location assumption and the second quasi co-location assumption of the shared data channel.

In some examples, to support monitoring, the monitoring component 935 may be configured as or otherwise support a means for monitoring, via the set of multiple receive beams, a set of multiple control resource sets including the at least one control resource set via a first beam and the shared data channel using a second beam corresponding to one of the first quasi co-location assumption or the second quasi co-location assumption based on the priority rule indicating to monitor the set of multiple control resource sets when the set of multiple control resource sets each correspond to a same quasi co-location assumption that differs from the first quasi co-location assumption and the second quasi co-location assumption of the shared data channel.

In some examples, to support monitoring, the monitoring component 935 may be configured as or otherwise support a means for monitoring the at least one control resource set of a set of multiple control resource sets via a first beam of the set of multiple receive beams and monitoring the shared data channel and a second control resource set of the set of multiple control resource sets via a second beam of the set of multiple receive beams based on the priority rule indicating to monitor the at least one control resource set via the first beam and to monitor the shared data channel and the second control resource set via the second beam when the second control resource set corresponds to a same quasi co-location assumption as the first quasi co-location assumption or the second quasi co-location assumption for the shared data channel.

In some examples, to support monitoring, the monitoring component 935 may be configured as or otherwise support a means for monitoring, via the set of multiple receive beams, a set of multiple control resource sets including the at least one control resource set based on the priority rule indicating to monitor the set of multiple control resource sets when the set of multiple control resource sets each correspond to a different quasi co-location assumption that differs from the first quasi co-location assumption, the second quasi co-location assumption, or both of the shared data channel.

In some examples, to support monitoring, the monitoring component 935 may be configured as or otherwise support a means for monitoring the at least one control resource set of a set of multiple control resource sets via a first beam of the set of multiple receive beams and monitoring the shared data channel and a second control resource set of the set of multiple control resource sets via a second beam of the set of multiple receive beams based on the priority rule indicating to monitor the at least one control resource set via the first beam and to monitor the shared data channel and the second control resource set via the second beam when the second control resource set corresponds to a same quasi co-location assumption as the first quasi co-location assumption or the second quasi co-location assumption for the shared data channel.

In some examples, to support monitoring, the monitoring component 935 may be configured as or otherwise support a means for monitoring a first control resource set of the at least one control resource set and the shared data channel via a first beam of the set of multiple receive beams, and monitoring a second control resource set of the at least one control resource set and the shared data channel via a second beam of the set of multiple receive beams, based on the priority rule indicating to monitor the first control resource set and the shared data channel via the first beam and to monitor the second control resource set and the shared data channel via the second beam when the first control resource set corresponds to the first quasi co-location assumption and the second control resource set corresponds to the second quasi co-location assumption.

In some examples, to support monitoring, the monitoring component 935 may be configured as or otherwise support a means for monitoring the single control resource set via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states when the set of multiple transmission configuration indicator states each correspond to a respective different quasi co-location assumption than the first quasi co-location assumption and the second quasi co-location assumption.

In some examples, the monitoring component 935 may be configured as or otherwise support a means for refraining from monitoring the shared data channel based on the set of multiple transmission configuration indicator states each corresponding to the respective different quasi co-location assumptions than the first quasi co-location assumption and the second quasi co-location assumption.

In some examples, to support monitoring, the monitoring component 935 may be configured as or otherwise support a means for monitoring the single control resource set via a first beam of the set of multiple receive beams associated with a first transmission configuration indicator state of the set of multiple transmission configuration indicator states and via a second beam of the set of multiple receive beams associated with a second transmission configuration indicator state of the set of multiple transmission configuration indicator states, and monitoring the shared data channel via the second quasi co-location assumption when one of the set of multiple transmission configuration indicator states of the single control resource set corresponds to the first quasi co-location assumption or the second quasi co-location assumption.

In some examples, the information component 940 may be configured as or otherwise support a means for receiving at least one control message via the at least one control resource set, a data message via the shared data channel, or both, based on the monitoring.

In some examples, to support receiving the control signaling, the control signal component 925 may be configured as or otherwise support a means for receiving the control signaling indicating the priority rule.

In some examples, a time difference between the control message and a scheduled occasion to monitor the shared data channel fails to satisfy a threshold time duration, one or more quasi co-location assumptions of the shared data channel includes a default assumption, the one or more quasi co-location assumptions of the shared data channel are based on one or more multiplexing schemes, the shared data channel and the at least one control resource set are in different component carriers for intra-band carrier aggregation, or any combination thereof.

Figure 10:
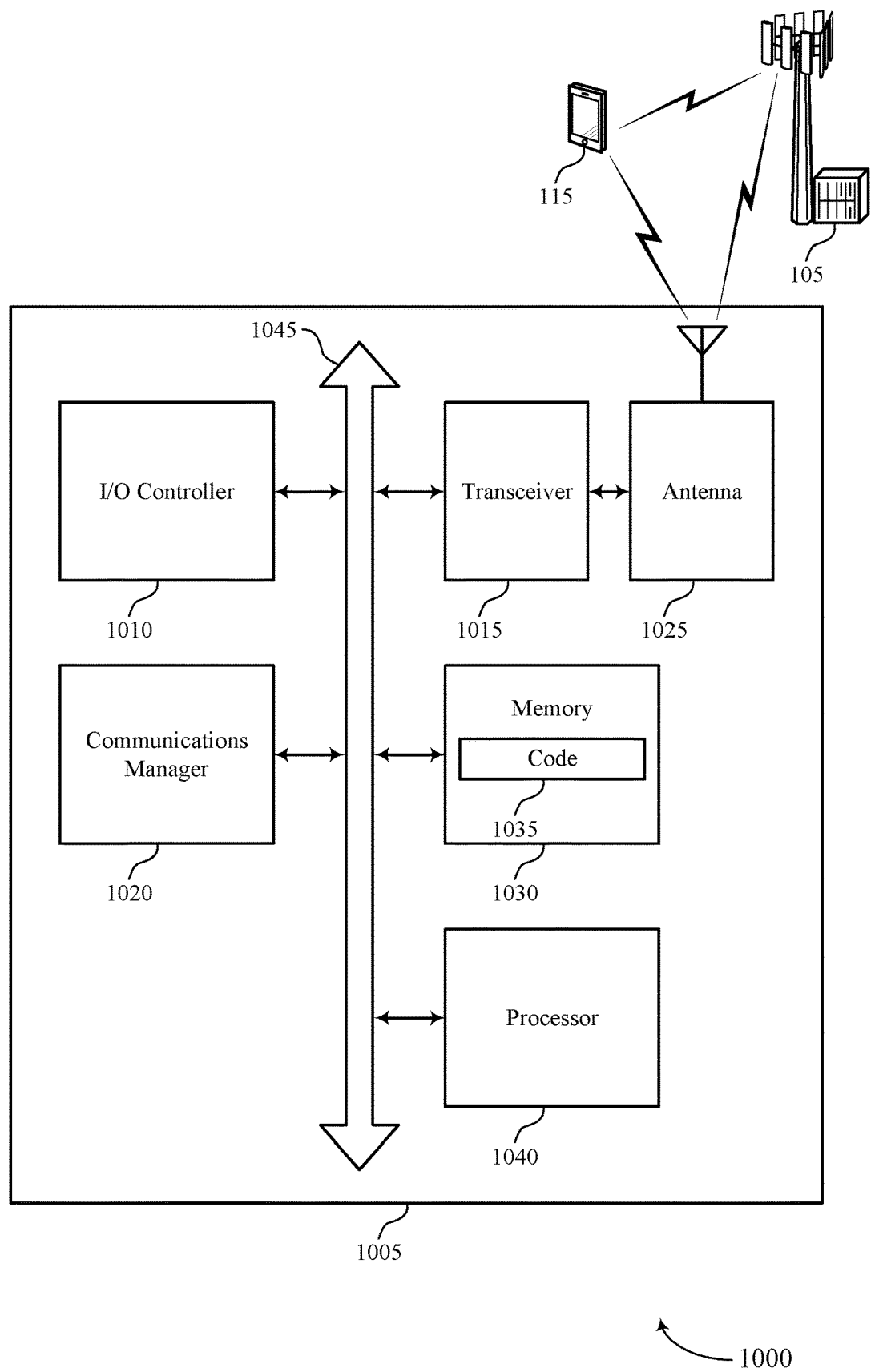
FIG. 10 shows a diagram of a system including a device that supports quasi co-location prioritization for wireless communications systems in accordance with aspects of the present disclosure.

FIG. 10 shows a diagram of a system 1000 including a device 1005 that supports quasi co-location prioritization for wireless communications systems in accordance with aspects of the present disclosure. The device 1005 may be an example of or include the components of a device 705, a device 805, or a UE 115 as described herein. The device 1005 may communicate wirelessly with one or more network entities 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting quasi co-location prioritization for wireless communications systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving control signaling indicating to the UE to monitor at least one control resource set. The communications manager 1020 may be configured as or otherwise support a means for receiving a control message indicating to the UE to monitor a shared data channel that overlaps in time with the at least one control resource set. The communications manager 1020 may be configured as or otherwise support a means for monitoring, via a set of multiple receive beams, the at least one control resource set, the shared data channel, or both, based on a priority rule for allocating the set of multiple receive beams of the UE for monitoring of the at least one control resource set, the shared data channel, or both.

By including or configuring the communications manager 1020 in accordance with examples as described herein, the device 1005 may support techniques for QCL prioritization as described herein. For example, the device 1005 may support priority rules for selecting QCL assumptions for monitoring one or more CORESETs and/or downlink messages, which may enable the device 1005 to realize one or more potential advantages such as improved communications efficiency, reliability, or both.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of quasi co-location prioritization for wireless communications systems as described herein, or the processor 1040 and the memory 1030 may be otherwise configured to perform or support such operations.

Figure 11:
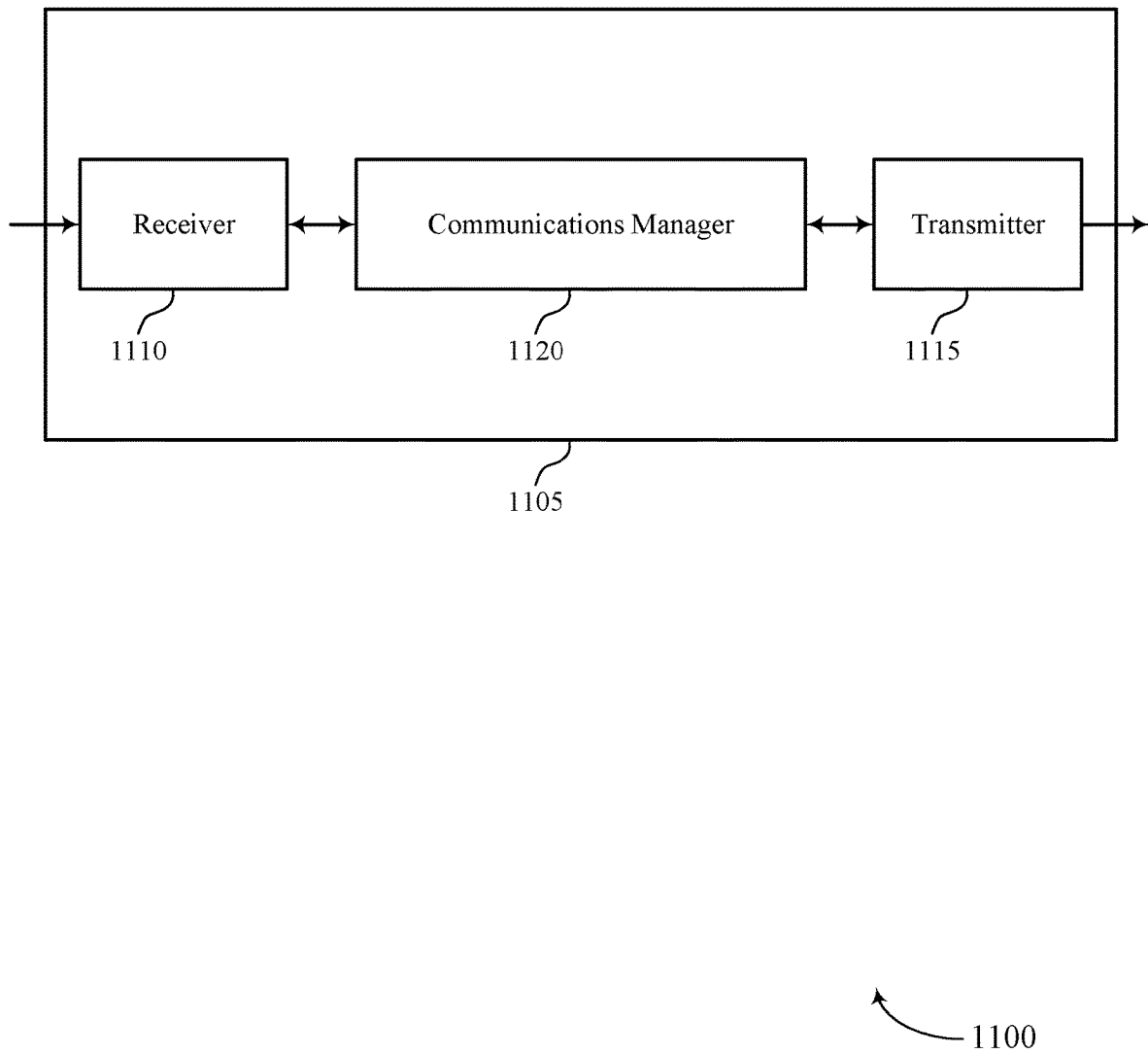
FIGS. 11 and 12 show block diagrams of devices that support quasi co-location prioritization for wireless communications systems in accordance with aspects of the present disclosure.

FIG. 11 shows a block diagram 1100 of a device 1105 that supports quasi co-location prioritization for wireless communications systems in accordance with aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to quasi co-location prioritization for wireless communications systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to quasi co-location prioritization for wireless communications systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of quasi co-location prioritization for wireless communications systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. For example, the communications manager 1120 may be configured as or otherwise support a means for transmitting control signaling indicating to a UE to monitor at least one control resource set. The communications manager 1120 may be configured as or otherwise support a means for transmitting a control message indicating to the UE to monitor a shared data channel that overlaps in time with the at least one control resource set. The communications manager 1120 may be configured as or otherwise support a means for transmitting, the at least one control resource set, the shared data channel, or both, based on a priority rule for the UE to allocate a set of multiple receive beams for monitoring of the at least one control resource set, the shared data channel, or both.

Figure 12:
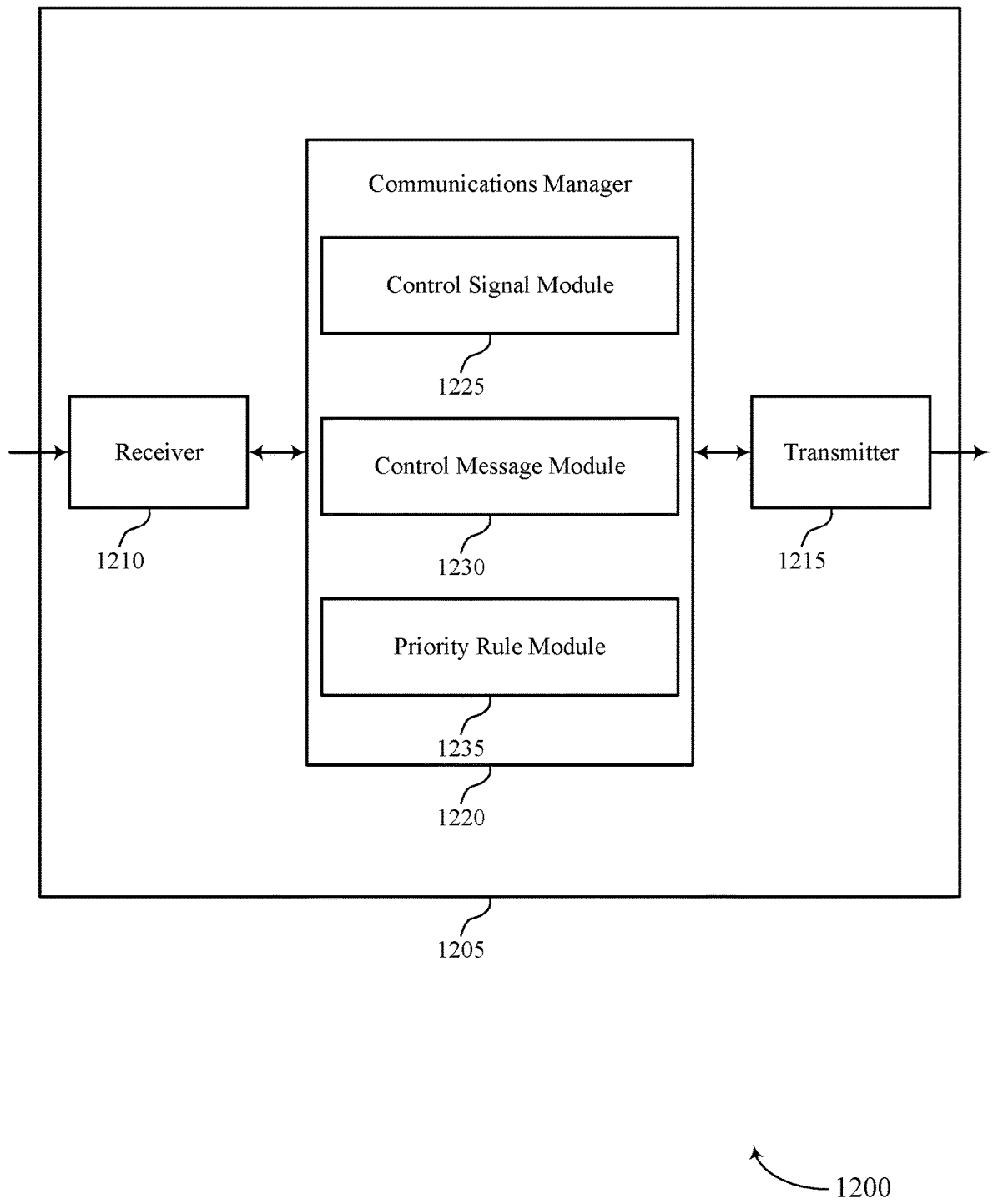

FIG. 12 shows a block diagram 1200 of a device 1205 that supports quasi co-location prioritization for wireless communications systems in accordance with aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to quasi co-location prioritization for wireless communications systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to quasi co-location prioritization for wireless communications systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of quasi co-location prioritization for wireless communications systems as described herein. For example, the communications manager 1220 may include a control signal module 1225, a control message module 1230, a priority rule module 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a network entity in accordance with examples as disclosed herein. The control signal module 1225 may be configured as or otherwise support a means for transmitting control signaling indicating to a UE to monitor at least one control resource set. The control message module 1230 may be configured as or otherwise support a means for transmitting a control message indicating to the UE to monitor a shared data channel that overlaps in time with the at least one control resource set. The priority rule module 1235 may be configured as or otherwise support a means for transmitting, the at least one control resource set, the shared data channel, or both, based on a priority rule for the UE to allocate a set of multiple receive beams for monitoring of the at least one control resource set, the shared data channel, or both.

Figure 13:
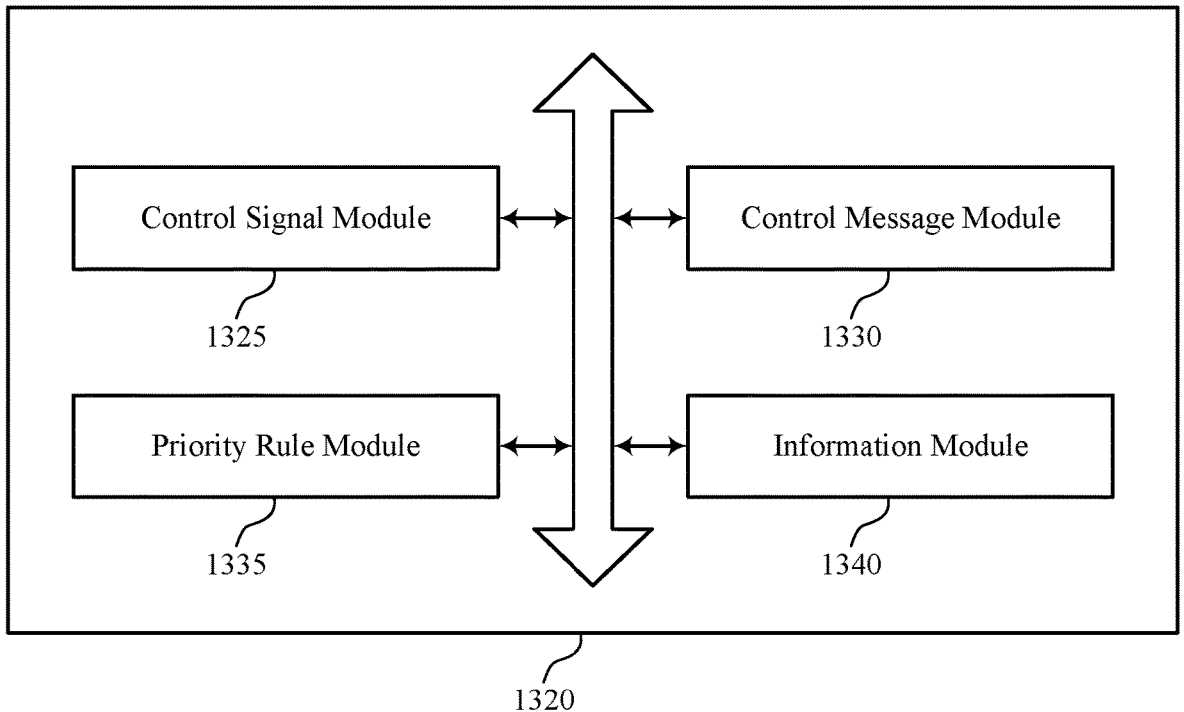
FIG. 13 shows a block diagram of a communications manager that supports quasi co-location prioritization for wireless communications systems in accordance with aspects of the present disclosure.

FIG. 13 shows a block diagram 1300 of a communications manager 1320 that supports quasi co-location prioritization for wireless communications systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of quasi co-location prioritization for wireless communications systems as described herein. For example, the communications manager 1320 may include a control signal module 1325, a control message module 1330, a priority rule module 1335, an information module 1340, or any combination thereof. Each of these components may communicate, directly or indirectly, with one another (e.g., via one or more buses).

The communications manager 1320 may support wireless communication at a network entity in accordance with examples as disclosed herein. The control signal module 1325 may be configured as or otherwise support a means for transmitting control signaling indicating to a UE to monitor at least one control resource set. The control message module 1330 may be configured as or otherwise support a means for transmitting a control message indicating to the UE to monitor a shared data channel that overlaps in time with the at least one control resource set. The priority rule module 1335 may be configured as or otherwise support a means for transmitting, the at least one control resource set, the shared data channel, or both, based on a priority rule for the UE to allocate a set of multiple receive beams for monitoring of the at least one control resource set, the shared data channel, or both.

In some examples, to support transmitting, the priority rule module 1335 may be configured as or otherwise support a means for transmitting, via a set of multiple transmit beams corresponding to the set of multiple receive beams of the UE, a set of multiple control resource sets including the at least one control resource set based on the priority rule indicating the UE is to monitor the set of multiple control resource sets when each of the set of multiple control resource sets corresponds to a same quasi co-location assumption that differs from a quasi co-location assumption of the shared data channel.

In some examples, to support transmitting, the priority rule module 1335 may be configured as or otherwise support a means for transmitting a set of multiple control resource sets including the at least one control resource set via a first transmit beam corresponding to a first receive beam of the set of multiple receive beams and the shared data channel via a second transmit beam corresponding to a second receive beam of the set of multiple receive beams based on the priority rule indicating the UE is to monitor the set of multiple control resource sets via the first receive beam when each of the set of multiple control resource sets corresponds to a same quasi co-location assumption that differs from a second quasi co-location assumption of the shared data channel.

In some examples, to support transmitting, the priority rule module 1335 may be configured as or otherwise support a means for transmitting, via a set of multiple transmit beams corresponding to the set of multiple receive beams of the UE, a set of multiple control resource sets including the at least one control resource set based on the priority rule indicating the UE is to monitor the set of multiple control resource sets when the set of multiple control resource sets and the shared data channel each correspond to a different respective quasi co-location assumption.

In some examples, to support transmitting, the priority rule module 1335 may be configured as or otherwise support a means for transmitting the at least one control resource set of a set of multiple control resource sets via a first transmit beam corresponding to a first receive beam of the set of multiple receive beams and transmitting the shared data channel and a second control resource set of the set of multiple control resource sets via a second transmit beam corresponding to a second receive beam of the set of multiple receive beams based on the priority rule indicating the UE is to monitor the at least one control resource set via the first receive beam and to monitor the shared data channel and the second control resource set via the second receive beam when the second control resource set and the shared data channel correspond to a same quasi co-location assumption.

In some examples, to support transmitting, the priority rule module 1335 may be configured as or otherwise support a means for transmitting the single control resource set via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states when the set of multiple transmission configuration indicator states each correspond to a different quasi co-location assumption than the shared data channel.

In some examples, to support transmitting, the priority rule module 1335 may be configured as or otherwise support a means for transmitting the single control resource set via a first transmit beam corresponding to a first receive beam of the set of multiple receive beams associated with a first quasi co-location assumption of the set of multiple quasi co-location assumptions and via a second transmit beam corresponding to a second receive beam of the set of multiple receive beams associated with a second quasi co-location assumption of the set of multiple quasi co-location assumptions, and transmitting the shared data channel via the second transmit beam when the single control resource set and the shared data channel correspond to a same quasi co-location assumption.

In some examples, to support transmitting, the priority rule module 1335 may be configured as or otherwise support a means for transmitting, via a set of multiple transmit beams corresponding to the set of multiple receive beams of the UE, a set of multiple control resource sets including the at least one control resource set based on the priority rule indicating the UE is to monitor the set of multiple control resource sets when each of the set of multiple control resource sets corresponds to a same quasi co-location assumption that differs from the first quasi co-location assumption and the second quasi co-location assumption of the shared data channel.

In some examples, to support transmitting, the priority rule module 1335 may be configured as or otherwise support a means for transmitting, via a set of multiple transmit beams corresponding to the set of multiple receive beams of the UE, a set of multiple control resource sets including the at least one control resource set via a first transmit beam and the shared data channel using a second transmit beam corresponding to one of the first quasi co-location assumption or the second quasi co-location assumption based on the priority rule indicating the UE is to monitor the set of multiple control resource sets when the set of multiple control resource sets each correspond to a same quasi co-location assumption that differs from the first quasi co-location assumption and the second quasi co-location assumption of the shared data channel.

In some examples, to support transmitting, the priority rule module 1335 may be configured as or otherwise support a means for transmitting the at least one control resource set of a set of multiple control resource sets via a first transmit beam corresponding to a first receive beam of the set of multiple receive beams and monitoring the shared data channel and a second control resource set of the set of multiple control resource sets via a second transmit beam corresponding to a second receive beam of the set of multiple receive beams based on the priority rule indicating the UE is to monitor the at least one control resource set via the first receive beam and to monitor the shared data channel and the second control resource set via the second receive beam when the second control resource set corresponds to a same quasi co-location assumption as the first co-location assumption or the second quasi co-location assumption for the shared data channel.

In some examples, to support transmitting, the priority rule module 1335 may be configured as or otherwise support a means for transmitting, via a set of multiple transmit beams corresponding to the set of multiple receive beams of the UE, a set of multiple control resource sets including the at least one control resource set based on the priority rule indicating the UE is to monitor the set of multiple control resource sets when the set of multiple control resource sets each correspond to a different quasi co-location assumption that differs from the first quasi co-location assumption, the second quasi co-location assumption, or both of the shared data channel.

In some examples, to support transmitting, the priority rule module 1335 may be configured as or otherwise support a means for transmitting the at least one control resource set of a set of multiple control resource sets via a first transmit beam corresponding to a first receive beam of the set of multiple receive beams and transmitting the shared data channel and a second control resource set of the set of multiple control resource sets via a second transmit beam corresponding to a second receive beam of the set of multiple receive beams based on the priority rule indicating the UE is to monitor the at least one control resource set via the first receive beam and to monitor the shared data channel and the second control resource set via the second receive beam when the second control resource set corresponds to a same quasi co-location assumption as the first quasi co-location assumption or the second quasi co-location assumption for the shared data channel.

In some examples, to support transmitting, the priority rule module 1335 may be configured as or otherwise support a means for transmitting a first control resource set of the at least one control resource set and the shared data channel via a first transmit beam corresponding to a first receive beam of the set of multiple receive beams, and transmitting a second control resource set of the at least one control resource set and the shared data channel via a second transmit beam corresponding to a second receive beam of the set of multiple receive beams based on the priority rule indicating the UE is to monitor the first control resource set and the shared data channel via the first receive beam and to monitor the second control resource set and the shared data channel via the second receive beam when the first control resource set corresponds to the first quasi co-location assumption and the second control resource set corresponds to the second quasi co-location assumption.

In some examples, to support transmitting, the priority rule module 1335 may be configured as or otherwise support a means for transmitting the single control resource set via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states when the set of multiple transmission configuration indicator states each correspond to a respective different quasi co-location assumption than the first quasi co-location assumption and the second quasi co-location assumption.

In some examples, to support transmitting, the priority rule module 1335 may be configured as or otherwise support a means for transmitting the single control resource set via a first transmit beam corresponding to a first receive beam of the set of multiple receive beams associated with a first transmission configuration indicator state of the set of multiple transmission configuration indicator states and via a second transmit beam corresponding to a second receive beam of the set of multiple receive beams associated with a second transmission configuration indicator state of the set of multiple transmission configuration indicator states, and transmitting the shared data channel via the second quasi co-location assumption when one of the set of multiple transmission configuration indicator states of the single control resource set corresponds to the first quasi co-location assumption or the second quasi co-location assumption.

In some examples, the information module 1340 may be configured as or otherwise support a means for transmitting at least one control message via the at least one control resource set, a data message via the shared data channel, or both.

In some examples, to support transmitting the control signaling, the control signal module 1325 may be configured as or otherwise support a means for transmitting the control signaling indicating the priority rule.

In some examples, a time difference between the control message and a scheduled occasion to monitor the shared data channel fails to satisfy a threshold time duration, one or more quasi co-location assumptions of the shared data channel includes a default assumption, the one or more quasi co-location assumptions of the shared data channel are based on one or more multiplexing schemes, the shared data channel and the at least one control resource set are in different component carriers for intra-band carrier aggregation, or any combination thereof.

Figure 14:
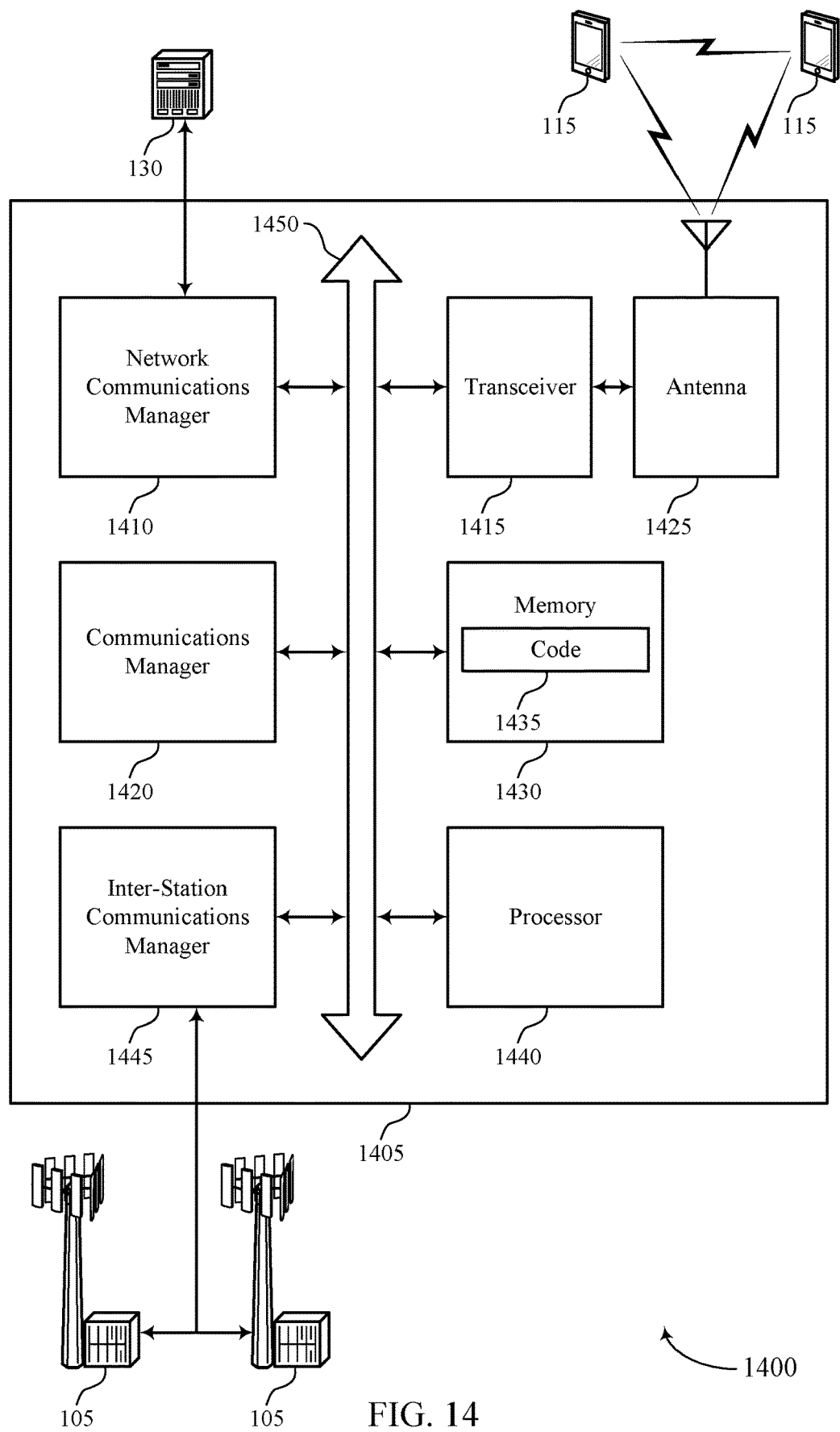
FIG. 14 shows a diagram of a system including a device that supports quasi co-location prioritization for wireless communications systems in accordance with aspects of the present disclosure.

FIG. 14 shows a diagram of a system 1400 including a device 1405 that supports quasi co-location prioritization for wireless communications systems in accordance with aspects of the present disclosure. The device 1405 may be an example of or include the components of a device 1105, a device 1205, or a network entity 105 as described herein. The device 1405 may communicate wirelessly with one or more network entities 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting quasi co-location prioritization for wireless communications systems). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting control signaling indicating to a UE to monitor at least one control resource set. The communications manager 1420 may be configured as or otherwise support a means for transmitting a control message indicating to the UE to monitor a shared data channel that overlaps in time with the at least one control resource set. The communications manager 1420 may be configured as or otherwise support a means for transmitting, the at least one control resource set, the shared data channel, or both, based on a priority rule for the UE to allocate a set of multiple receive beams for monitoring of the at least one control resource set, the shared data channel, or both.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of quasi co-location prioritization for wireless communications systems as described herein, or the processor 1440 and the memory 1430 may be otherwise configured to perform or support such operations.

Figure 15:
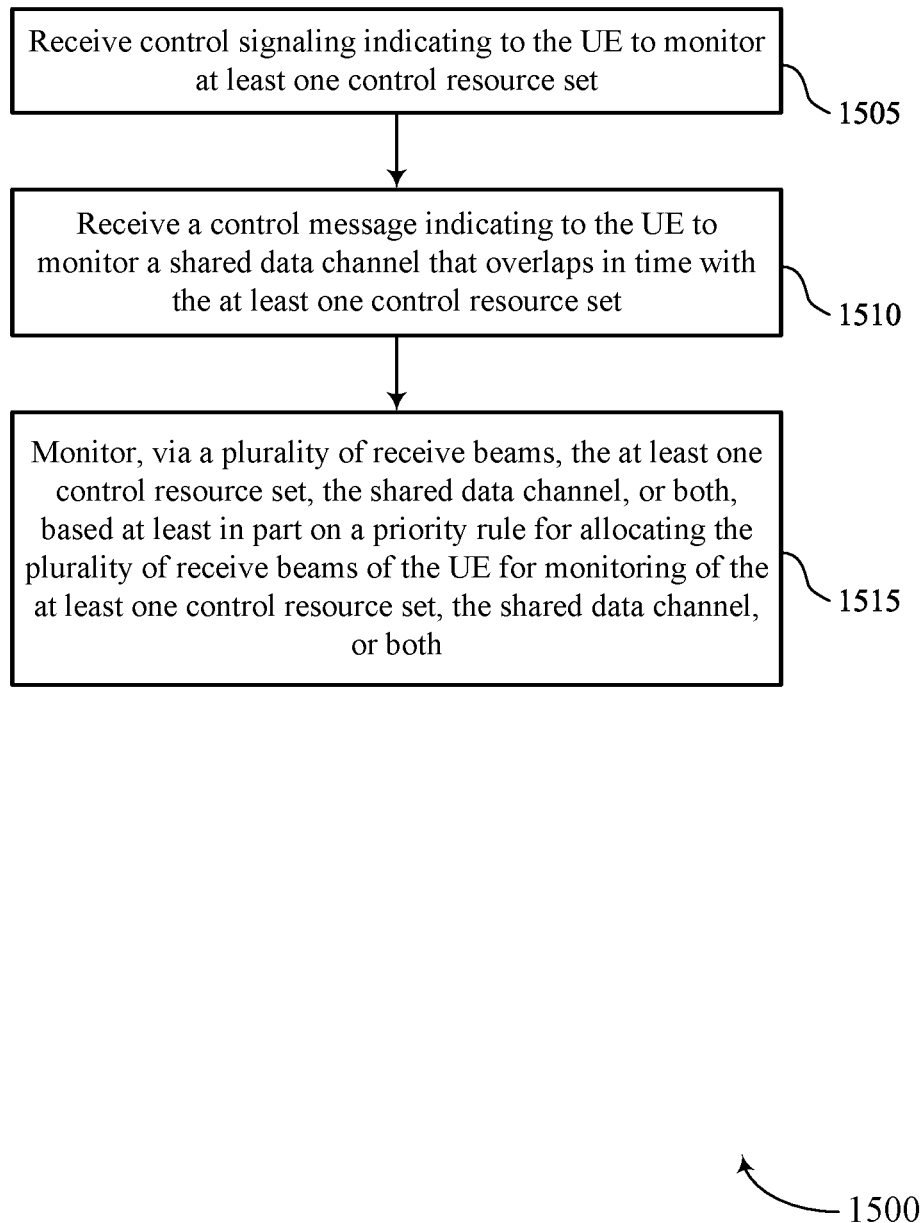
FIGS. 15 through 18 show flowcharts illustrating methods that support quasi co-location prioritization for wireless communications systems in accordance with aspects of the present disclosure.

FIG. 15 shows a flowchart illustrating a method 1500 that supports quasi co-location prioritization for wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating to the UE to monitor at least one control resource set. The operations of 1505 may be performed in accordance with examples as disclosed herein. In some examples, aspects of the operations of 1505 may be performed by a control signal component 925 as described with reference to FIG. 9.

At 1510, the method may include receiving a control message indicating to the UE to monitor a shared data channel that overlaps in time with the at least one control resource set. The operations of 1510 may be performed in accordance with examples as disclosed herein. In some examples, aspects of the operations of 1510 may be performed by a control message component 930 as described with reference to FIG. 9.

At 1515, the method may include monitoring, via a set of multiple receive beams, the at least one control resource set, the shared data channel, or both, based on a priority rule for allocating the set of multiple receive beams of the UE for monitoring of the at least one control resource set, the shared data channel, or both. The operations of 1515 may be performed in accordance with examples as disclosed herein. In some examples, aspects of the operations of 1515 may be performed by a monitoring component 935 as described with reference to FIG. 9.

Figure 16:
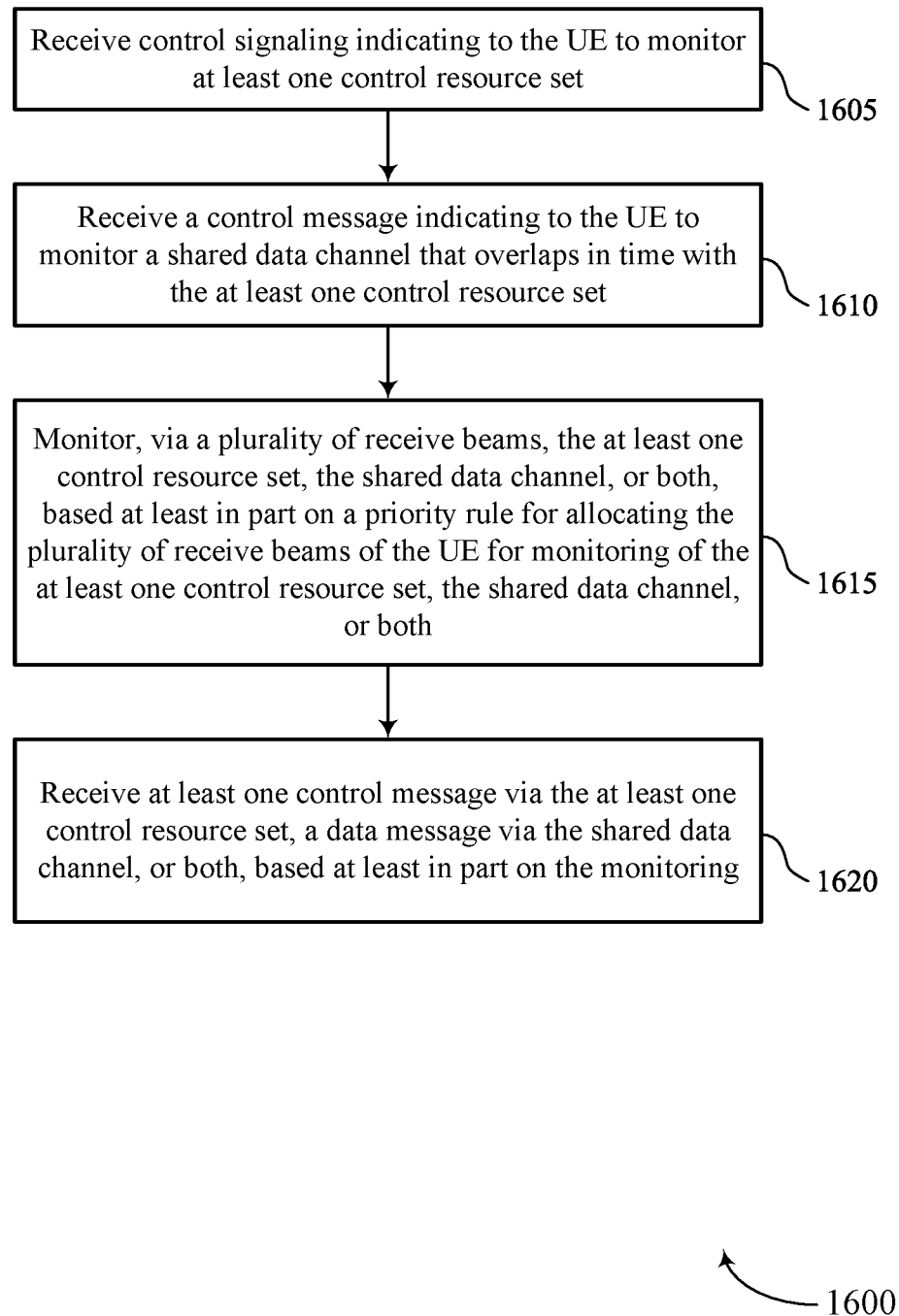

FIG. 16 shows a flowchart illustrating a method 1600 that supports quasi co-location prioritization for wireless communications systems in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating to the UE to monitor at least one control resource set. The operations of 1605 may be performed in accordance with examples as disclosed herein. In some examples, aspects of the operations of 1605 may be performed by a control signal component 925 as described with reference to FIG. 9.

At 1610, the method may include receiving a control message indicating to the UE to monitor a shared data channel that overlaps in time with the at least one control resource set. The operations of 1610 may be performed in accordance with examples as disclosed herein. In some examples, aspects of the operations of 1610 may be performed by a control message component 930 as described with reference to FIG. 9.

At 1615, the method may include monitoring, via a set of multiple receive beams, the at least one control resource set, the shared data channel, or both, based on a priority rule for allocating the set of multiple receive beams of the UE for monitoring of the at least one control resource set, the shared data channel, or both. The operations of 1615 may be performed in accordance with examples as disclosed herein. In some examples, aspects of the operations of 1615 may be performed by a monitoring component 935 as described with reference to FIG. 9.

At 1620, the method may include receiving at least one control message via the at least one control resource set, a data message via the shared data channel, or both, based on the monitoring. The operations of 1620 may be performed in accordance with examples as disclosed herein. In some examples, aspects of the operations of 1620 may be performed by an information component 940 as described with reference to FIG. 9.

Figure 17:
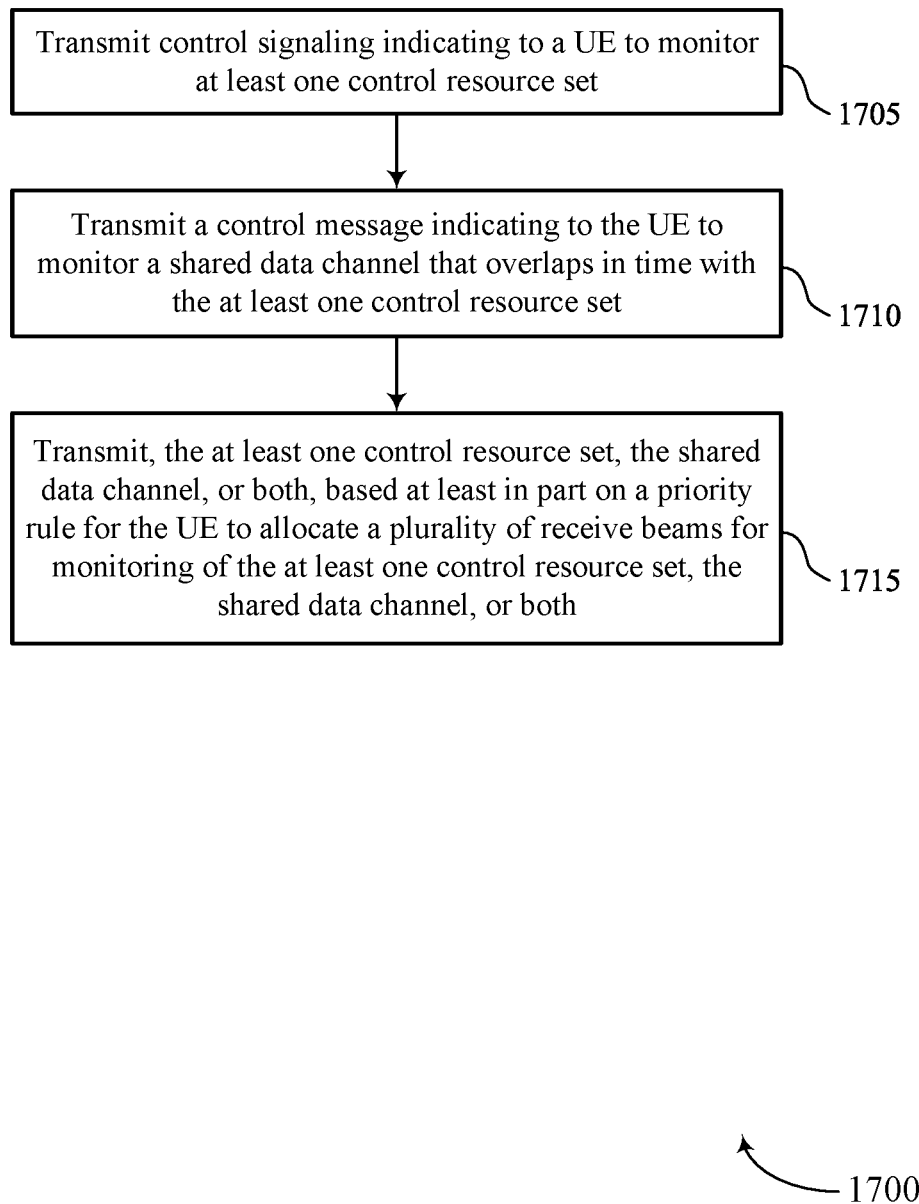

FIG. 17 shows a flowchart illustrating a method 1700 that supports quasi co-location prioritization for wireless communications systems in accordance with aspects of the present disclosure. The operations of the method 1700 may be implemented by a network entity or its components as described herein. For example, the operations of the method 1700 may be performed by a network entity 105 as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 1705, the method may include transmitting control signaling indicating to a UE to monitor at least one control resource set. The operations of 1705 may be performed in accordance with examples as disclosed herein. In some examples, aspects of the operations of 1705 may be performed by a control signal module 1325 as described with reference to FIG. 13.

At 1710, the method may include transmitting a control message indicating to the UE to monitor a shared data channel that overlaps in time with the at least one control resource set. The operations of 1710 may be performed in accordance with examples as disclosed herein. In some examples, aspects of the operations of 1710 may be performed by a control message module 1330 as described with reference to FIG. 13.

At 1715, the method may include transmitting, the at least one control resource set, the shared data channel, or both, based on a priority rule for the UE to allocate a set of multiple receive beams for monitoring of the at least one control resource set, the shared data channel, or both. The operations of 1715 may be performed in accordance with examples as disclosed herein. In some examples, aspects of the operations of 1715 may be performed by a priority rule module 1335 as described with reference to FIG. 13.

Figure 18:
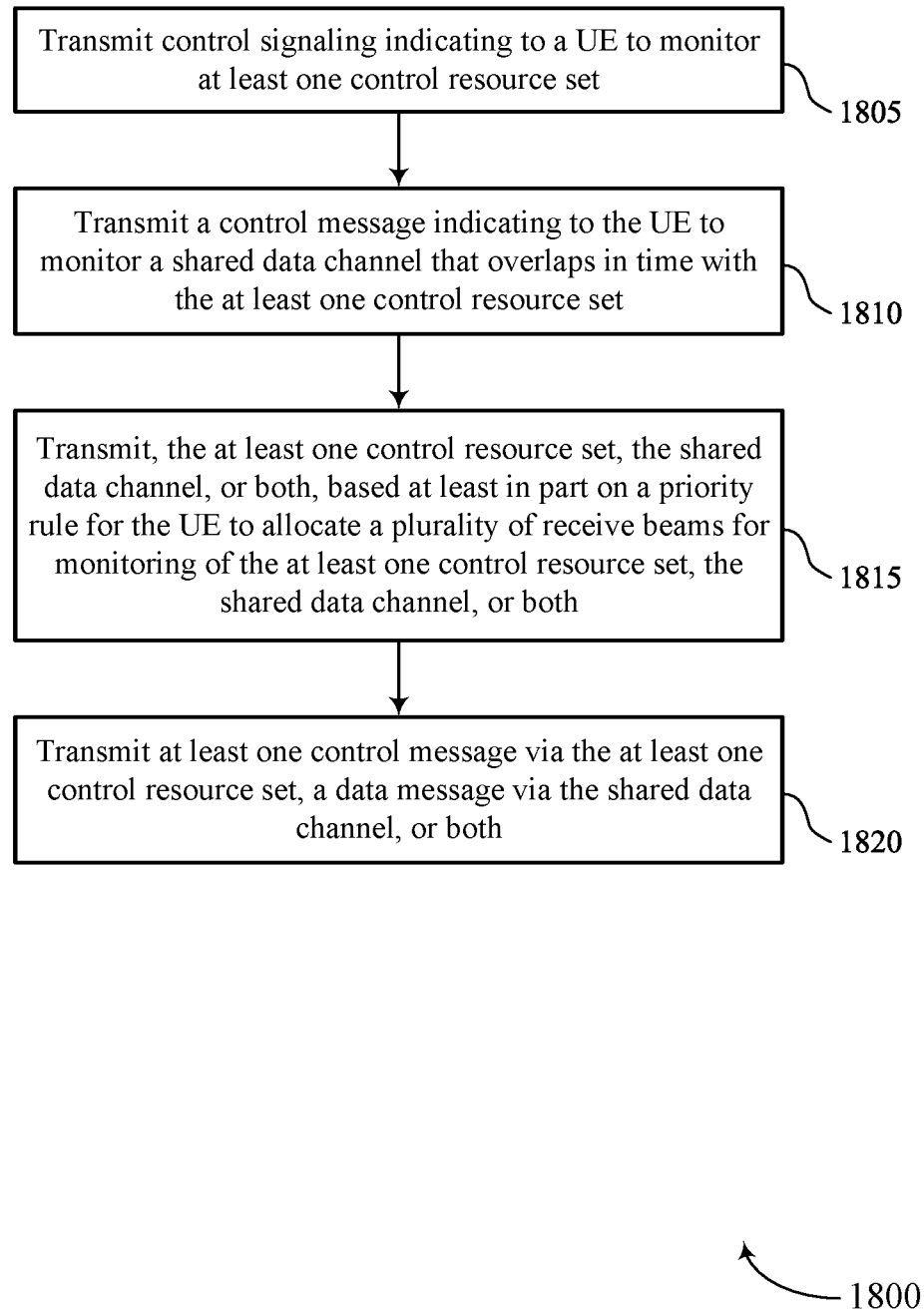

FIG. 18 shows a flowchart illustrating a method 1800 that supports quasi co-location prioritization for wireless communications systems in accordance with aspects of the present disclosure. The operations of the method 1800 may be implemented by a network entity or its components as described herein. For example, the operations of the method 1800 may be performed by a network entity 105 as described with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 1805, the method may include transmitting control signaling indicating to a UE to monitor at least one control resource set. The operations of 1805 may be performed in accordance with examples as disclosed herein. In some examples, aspects of the operations of 1805 may be performed by a control signal module 1325 as described with reference to FIG. 13.

At 1810, the method may include transmitting a control message indicating to the UE to monitor a shared data channel that overlaps in time with the at least one control resource set. The operations of 1810 may be performed in accordance with examples as disclosed herein. In some examples, aspects of the operations of 1810 may be performed by a control message module 1330 as described with reference to FIG. 13.

At 1815, the method may include transmitting, the at least one control resource set, the shared data channel, or both, based on a priority rule for the UE to allocate a set of multiple receive beams for monitoring of the at least one control resource set, the shared data channel, or both. The operations of 1815 may be performed in accordance with examples as disclosed herein. In some examples, aspects of the operations of 1815 may be performed by a priority rule module 1335 as described with reference to FIG. 13.

At 1820, the method may include transmitting at least one control message via the at least one control resource set, a data message via the shared data channel, or both. The operations of 1820 may be performed in accordance with examples as disclosed herein. In some examples, aspects of the operations of 1820 may be performed by an information module 1340 as described with reference to FIG. 13.

The following provides an overview of aspects of the present disclosure:

Aspect 1: A method for wireless communication at a UE, comprising: receiving control signaling indicating to the UE to monitor at least one CORESET; receiving a control message indicating to the UE to monitor a shared data channel that overlaps in time with the at least one CORESET; and monitoring, via a plurality of receive beams, the at least one CORESET, the shared data channel, or both, based at least in part on a priority rule for allocating the plurality of receive beams of the UE for monitoring of the at least one CORESET, the shared data channel, or both.

Aspect 2: The method of aspect 1, wherein monitoring further comprises: monitoring, via the plurality of receive beams, a plurality of CORESETs comprising the at least one CORESET based at least in part on the priority rule indicating to monitor the plurality of CORESETs when each of the plurality of CORESETs corresponds to a same QCL assumption that differs from a QCL assumption of the shared data channel.

Aspect 3: The method of aspect 2, further comprising: refraining from monitoring the shared data channel based at least in part on each of the plurality of CORESETs corresponding to the same QCL assumption that differs from the QCL assumption of the shared data channel.

Aspect 4: The method of any of aspects 1 through 3, wherein monitoring further comprises: monitoring a plurality of CORESETs comprising the at least one CORESET via a first beam of the plurality of receive beams and the shared data channel via a second beam of the plurality of receive beams based at least in part on the priority rule indicating to monitor the plurality of CORESETs via the first beam when each of the plurality of CORESETs corresponds to a same QCL assumption that differs from a second QCL assumption of the shared data channel.

Aspect 5: The method of any of aspects 1 through 4, wherein monitoring further comprises: monitoring, via the plurality of receive beams, a plurality of CORESETs comprising the at least one CORESET based at least in part on the priority rule indicating to monitor the plurality of CORESETs when the plurality of CORESETs and the shared data channel each correspond to a different respective QCL assumption.

Aspect 6: The method of any of aspects 1 through 5, wherein monitoring further comprises: monitoring the at least one CORESET of a plurality of CORESETs via a first beam of the plurality of receive beams and monitoring the shared data channel and a second CORESET of the plurality of CORESETs via a second beam of the plurality of receive beams based at least in part on the priority rule indicating to monitor the at least one CORESET via the first beam and to monitor the shared data channel and the second CORESET via the second beam when the second CORESET and the shared data channel correspond to a same QCL assumption.

Aspect 7: The method of any of aspects 1 through 6, wherein the at least one CORESET is a single CORESET associated with a plurality of transmission configuration indicator states, wherein monitoring further comprises: monitoring the single CORESET via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states when the plurality of transmission configuration indicator states each correspond to a different QCL assumption than the shared data channel.

Aspect 8: The method of any of aspects 1 through 7, wherein the at least one CORESET is a single CORESET associated with a plurality of QCL assumptions, wherein monitoring further comprises: monitoring the single CORESET via a first beam of the plurality of receive beams associated with a first QCL assumption of the plurality of QCL assumptions and via a second beam of the plurality of receive beams associated with a second QCL assumption of the plurality of QCL assumptions, and monitoring the shared data channel via the second beam, when the single CORESET and the shared data channel correspond to a same QCL assumption.

Aspect 9: The method of any of aspects 1 through 8, wherein the shared data channel corresponds to a first QCL assumption and a second QCL assumption, and wherein monitoring further comprises: monitoring, via the plurality of receive beams, a plurality of CORESETs comprising the at least one CORESET based at least in part on the priority rule indicating to monitor the plurality of CORESETs when each of the plurality of CORESETs corresponds to a same QCL assumption that differs from the first QCL assumption and the second QCL assumption of the shared data channel.

Aspect 10: The method of aspect 9, further comprising: refraining from monitoring the shared data channel based at least in part on each of the plurality of CORESETs corresponding to the same QCL assumption that differs from the first QCL assumption and the second QCL assumption of the shared data channel.

Aspect 11: The method of any of aspects 1 through 10, wherein the shared data channel corresponds to a first QCL assumption and a second QCL assumption, and wherein monitoring further comprises: monitoring, via the plurality of receive beams, a plurality of CORESETs comprising the at least one CORESET via a first beam and the shared data channel using a second beam corresponding to one of the first QCL assumption or the second QCL assumption based at least in part on the priority rule indicating to monitor the plurality of CORESETs when the plurality of CORESETs each correspond to a same QCL assumption that differs from the first QCL assumption and the second QCL assumption of the shared data channel.

Aspect 12: The method of any of aspects 1 through 11, wherein the shared data channel corresponds to a first QCL assumption and a second QCL assumption, and wherein monitoring further comprises: monitoring the at least one CORESET of a plurality of CORESETs via a first beam of the plurality of receive beams and monitoring the shared data channel and a second CORESET of the plurality of CORESETs via a second beam of the plurality of receive beams based at least in part on the priority rule indicating to monitor the at least one CORESET via the first beam and to monitor the shared data channel and the second CORESET via the second beam when the second CORESET corresponds to a same QCL assumption as the first QCL assumption or the second QCL assumption for the shared data channel.

Aspect 13: The method of any of aspects 1 through 12, wherein the shared data channel corresponds to a first QCL assumption and a second QCL assumption, and wherein monitoring further comprises: monitoring, via the plurality of receive beams, a plurality of CORESETs comprising the at least one CORESET based at least in part on the priority rule indicating to monitor the plurality of CORESETs when the plurality of CORESETs each correspond to a different QCL assumption that differs from the first QCL assumption, the second QCL assumption, or both of the shared data channel.

Aspect 14: The method of any of aspects 1 through 13, wherein the shared data channel corresponds to a first QCL assumption and a second QCL assumption, and wherein monitoring further comprises: monitoring the at least one CORESET of a plurality of CORESETs via a first beam of the plurality of receive beams and monitoring the shared data channel and a second CORESET of the plurality of CORESETs via a second beam of the plurality of receive beams based at least in part on the priority rule indicating to monitor the at least one CORESET via the first beam and to monitor the shared data channel and the second CORESET via the second beam when the second CORESET corresponds to a same QCL assumption as the first QCL assumption or the second QCL assumption for the shared data channel.

Aspect 15: The method of any of aspects 1 through 14, wherein the shared data channel corresponds to a first QCL assumption and a second QCL assumption, and wherein monitoring further comprises: monitoring a first CORESET of the at least one CORESET and the shared data channel via a first beam of the plurality of receive beams, and monitoring a second CORESET of the at least one CORESET and the shared data channel via a second beam of the plurality of receive beams, based at least in part on the priority rule indicating to monitor the first CORESET and the shared data channel via the first beam and to monitor the second CORESET and the shared data channel via the second beam when the first CORESET corresponds to the first QCL assumption and the second CORESET corresponds to the second QCL assumption.

Aspect 16: The method of any of aspects 1 through 15, wherein the at least one CORESET is a single CORESET associated with a plurality of transmission configuration indicator states, the shared data channel corresponds to a first QCL assumption and a second QCL assumption, or both, wherein monitoring further comprises: monitoring the single CORESET via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states when the plurality of transmission configuration indicator states each correspond to a respective different QCL assumption than the first QCL assumption and the second QCL assumption.

Aspect 17: The method of aspect 16, further comprising: refraining from monitoring the shared data channel based at least in part on the plurality of transmission configuration indicator states each corresponding to the respective different QCL assumptions than the first QCL assumption and the second QCL assumption.

Aspect 18: The method of any of aspects 1 through 17, wherein the at least one CORESET is a single CORESET associated with a plurality of transmission configuration indicator states, the shared data channel corresponds to a first QCL assumption and a second QCL assumption, or both, wherein monitoring further comprises: monitoring the single CORESET via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states, and monitoring the shared data channel via the second QCL assumption when one of the plurality of transmission configuration indicator states of the single CORESET corresponds to the first QCL assumption or the second QCL assumption.

Aspect 19: The method of any of aspects 1 through 18, further comprising: receiving at least one control message via the at least one CORESET, a data message via the shared data channel, or both, based at least in part on the monitoring.

Aspect 20: The method of any of aspects 1 through 19, wherein receiving the control signaling comprises: receiving the control signaling indicating the priority rule.

Aspect 21: The method of any of aspects 1 through 20, wherein a time difference between the control message and a scheduled occasion to monitor the shared data channel fails to satisfy a threshold time duration, one or more QCL assumptions of the shared data channel comprises a default assumption, the one or more QCL assumptions of the shared data channel are based on one or more multiplexing schemes, the shared data channel and the at least one CORESET are in different component carriers for intra-band carrier aggregation, or any combination thereof.

Aspect 22: A method for wireless communication at a network entity, comprising: transmitting control signaling indicating to a UE to monitor at least one CORESET; transmitting a control message indicating to the UE to monitor a shared data channel that overlaps in time with the at least one CORESET; and transmitting, the at least one CORESET, the shared data channel, or both, based at least in part on a priority rule for the UE to allocate a plurality of receive beams for monitoring of the at least one CORESET, the shared data channel, or both.

Aspect 23: The method of aspect 22, wherein the transmitting further comprises: transmitting, via a plurality of transmit beams corresponding to the plurality of receive beams of the UE, a plurality of CORESETs comprising the at least one CORESET based at least in part on the priority rule indicating the UE is to monitor the plurality of CORESETs when each of the plurality of CORESETs corresponds to a same QCL assumption that differs from a QCL assumption of the shared data channel.

Aspect 24: The method of any of aspects 22 through 23, wherein the transmitting further comprises: transmitting a plurality of CORESETs comprising the at least one CORESET via a first transmit beam corresponding to a first receive beam of the plurality of receive beams and the shared data channel via a second transmit beam corresponding to a second receive beam of the plurality of receive beams based at least in part on the priority rule indicating the UE is to monitor the plurality of CORESETs via the first receive beam when each of the plurality of CORESETs corresponds to a same QCL assumption that differs from a second QCL assumption of the shared data channel.

Aspect 25: The method of any of aspects 22 through 24, wherein the transmitting further comprises: transmitting, via a plurality of transmit beams corresponding to the plurality of receive beams of the UE, a plurality of CORESETs comprising the at least one CORESET based at least in part on the priority rule indicating the UE is to monitor the plurality of CORESETs when the plurality of CORESETs and the shared data channel each correspond to a different respective QCL assumption.

Aspect 26: The method of any of aspects 22 through 25, wherein the transmitting further comprises: transmitting the at least one CORESET of a plurality of CORESETs via a first transmit beam corresponding to a first receive beam of the plurality of receive beams and transmitting the shared data channel and a second CORESET of the plurality of CORESETs via a second transmit beam corresponding to a second receive beam of the plurality of receive beams based at least in part on the priority rule indicating the UE is to monitor the at least one CORESET via the first receive beam and to monitor the shared data channel and the second CORESET via the second receive beam when the second CORESET and the shared data channel correspond to a same QCL assumption.

Aspect 27: The method of any of aspects 22 through 26, wherein the at least one CORESET is a single CORESET associated with a plurality of transmission configuration indicator states, wherein the transmitting further comprises: transmitting the single CORESET via a first transmit beam corresponding to a first receive beam of the plurality of receive beams associated with a first transmission configuration indicator state of the plurality of transmission configuration indicator states and via a second transmit beam corresponding to a second receive beam of the plurality of receive beams associated with a second transmission configuration indicator state of the plurality of transmission configuration indicator states when the plurality of transmission configuration indicator states each correspond to a different QCL assumption than the shared data channel.

Aspect 28: The method of any of aspects 22 through 27, wherein the at least one CORESET is a single CORESET associated with a plurality of QCL assumptions, wherein the transmitting further comprises: transmitting the single CORESET via a first transmit beam corresponding to a first receive beam of the plurality of receive beams associated with a first QCL assumption of the plurality of QCL assumptions and via a second transmit beam corresponding to a second receive beam of the plurality of receive beams associated with a second QCL assumption of the plurality of QCL assumptions, and transmitting the shared data channel via the second transmit beam when the single CORESET and the shared data channel correspond to a same QCL assumption.

Aspect 29: The method of any of aspects 22 through 28, wherein the shared data channel corresponds to a first QCL assumption and a second QCL assumption, and wherein the transmitting further comprises: transmitting, via a plurality of transmit beams corresponding to the plurality of receive beams of the UE, a plurality of CORESETs comprising the at least one CORESET based at least in part on the priority rule indicating the UE is to monitor the plurality of CORESETs when each of the plurality of CORESETs corresponds to a same QCL assumption that differs from the first QCL assumption and the second QCL assumption of the shared data channel.

Aspect 30: The method of any of aspects 22 through 29, wherein the shared data channel corresponds to a first QCL assumption and a second QCL assumption, and wherein the transmitting further comprises: transmitting, via a plurality of transmit beams corresponding to the plurality of receive beams of the UE, a plurality of CORESETs comprising the at least one CORESET via a first transmit beam and the shared data channel using a second transmit beam corresponding to one of the first QCL assumption or the second QCL assumption based at least in part on the priority rule indicating the UE is to monitor the plurality of CORESETs when the plurality of CORESETs each correspond to a same QCL assumption that differs from the first QCL assumption and the second QCL assumption of the shared data channel.

Aspect 31: The method of any of aspects 22 through 30, wherein the shared data channel corresponds to a first QCL assumption and a second QCL assumption, and wherein the transmitting further comprises: transmitting the at least one CORESET of a plurality of CORESETs via a first transmit beam corresponding to a first receive beam of the plurality of receive beams and monitoring the shared data channel and a second CORESET of the plurality of CORESETs via a second transmit beam corresponding to a second receive beam of the plurality of receive beams based at least in part on the priority rule indicating the UE is to monitor the at least one CORESET via the first receive beam and to monitor the shared data channel and the second CORESET via the second receive beam when the second CORESET corresponds to a same QCL assumption as the first QCL assumption or the second QCL assumption for the shared data channel.

Aspect 32: The method of any of aspects 22 through 31, wherein the shared data channel corresponds to a first QCL assumption and a second QCL assumption, and wherein the transmitting further comprises: transmitting, via a plurality of transmit beams corresponding to the plurality of receive beams of the UE, a plurality of CORESETs comprising the at least one CORESET based at least in part on the priority rule indicating the UE is to monitor the plurality of CORESETs when the plurality of CORESETs each correspond to a different QCL assumption that differs from the first QCL assumption, the second QCL assumption, or both of the shared data channel.

Aspect 33: The method of any of aspects 22 through 32, wherein the shared data channel corresponds to a first QCL assumption and a second QCL assumption, and wherein the transmitting further comprises: transmitting the at least one CORESET of a plurality of CORESETs via a first transmit beam corresponding to a first receive beam of the plurality of receive beams and transmitting the shared data channel and a second CORESET of the plurality of CORESETs via a second transmit beam corresponding to a second receive beam of the plurality of receive beams based at least in part on the priority rule indicating the UE is to monitor the at least one CORESET via the first receive beam and to monitor the shared data channel and the second CORESET via the second receive beam when the second CORESET corresponds to a same QCL assumption as the first QCL assumption or the second QCL assumption for the shared data channel.

Aspect 34: The method of any of aspects 22 through 33, wherein the shared data channel corresponds to a first QCL assumption and a second QCL assumption, and wherein the transmitting further comprises: transmitting a first CORESET of the at least one CORESET and the shared data channel via a first transmit beam corresponding to a first receive beam of the plurality of receive beams, and transmitting a second CORESET of the at least one CORESET and the shared data channel via a second transmit beam corresponding to a second receive beam of the plurality of receive beams based at least in part on the priority rule indicating the UE is to monitor the first CORESET and the shared data channel via the first receive beam and to monitor the second CORESET and the shared data channel via the second receive beam when the first CORESET corresponds to the first QCL assumption and the second CORESET corresponds to the second QCL assumption.

Aspect 35: The method of any of aspects 22 through 34, wherein the at least one CORESET is a single CORESET associated with a plurality of transmission configuration indicator states, the shared data channel corresponds to a first QCL assumption and a second QCL assumption, or both, wherein the transmitting further comprises: transmitting the single CORESET via a first transmit beam corresponding to a first receive beam of the plurality of receive beams associated with a first transmission configuration indicator state of the plurality of transmission configuration indicator states and via a second transmit beam corresponding to a second receive beam of the plurality of receive beams associated with a second transmission configuration indicator state of the plurality of transmission configuration indicator states when the plurality of transmission configuration indicator states each correspond to a respective different QCL assumption than the first QCL assumption and the second QCL assumption.

Aspect 36: The method of any of aspects 22 through 35, wherein the at least one CORESET is a single CORESET associated with a plurality of transmission configuration indicator states, the shared data channel corresponds to a first QCL assumption and a second QCL assumption, or both, wherein the transmitting further comprises: transmitting the single CORESET via a first transmit beam corresponding to a first receive beam of the plurality of receive beams associated with a first transmission configuration indicator state of the plurality of transmission configuration indicator states and via a second transmit beam corresponding to a second receive beam of the plurality of receive beams associated with a second transmission configuration indicator state of the plurality of transmission configuration indicator states, and transmitting the shared data channel via the second QCL assumption when one of the plurality of transmission configuration indicator states of the single CORESET corresponds to the first QCL assumption or the second QCL assumption.

Aspect 37: The method of any of aspects 22 through 36, further comprising: transmitting at least one control message via the at least one CORESET, a data message via the shared data channel, or both.

Aspect 38: The method of any of aspects 22 through 37, wherein transmitting the control signaling comprises: transmitting the control signaling indicating the priority rule.

Aspect 39: The method of any of aspects 22 through 38, wherein a time difference between the control message and a scheduled occasion to monitor the shared data channel fails to satisfy a threshold time duration, one or more QCL assumptions of the shared data channel comprises a default assumption, the one or more QCL assumptions of the shared data channel are based on one or more multiplexing schemes, the shared data channel and the at least one CORESET are in different component carriers for intra-band carrier aggregation, or any combination thereof.

Aspect 40: An apparatus for wireless communication at a UE, comprising a processor; memory coupled with the processor; and instructions stored in the memory and executable by the processor to cause the apparatus to perform a method of any of aspects 1 through 21.

Aspect 41: An apparatus for wireless communication at a UE, comprising at least one means for performing a method of any of aspects 1 through 21.

Aspect 42: A non-transitory computer-readable medium storing code for wireless communication at a UE, the code comprising instructions executable by a processor to perform a method of any of aspects 1 through 21.

Aspect 43: An apparatus for wireless communication at a network entity, comprising a processor; memory coupled with the processor; and instructions stored in the memory and executable by the processor to cause the apparatus to perform a method of any of aspects 22 through 39.

Aspect 44: An apparatus for wireless communication at a network entity, comprising at least one means for performing a method of any of aspects 22 through 39.

Aspect 45: A non-transitory computer-readable medium storing code for wireless communication at a network entity, the code comprising instructions executable by a processor to perform a method of any of aspects 22 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling indicating to the UE to monitor at least one control resource set and indicating a priority rule for allocating a plurality of receive beams of the UE for monitoring the at least one control resource set when the at least one control resource set overlaps in time with a shared data channel;

receiving a control message indicating to the UE to monitor the shared data channel that overlaps in time with the at least one control resource set; and monitoring, via the plurality of receive beams, the at least one control resource set, the shared data channel, or both, based at least in part on the priority rule for allocating the plurality of receive beams of the UE for monitoring of the at least one control resource set, the shared data channel, or both.

2. The method of claim 1, wherein monitoring further comprises:
monitoring, via the plurality of receive beams, a plurality of control resource sets comprising the at least one control resource set based at least in part on the priority rule indicating to monitor the plurality of control resource sets when each of the plurality of control resource sets corresponds to a same quasi co-location assumption that differs from a quasi co-location assumption of the shared data channel.

3. The method of claim 2, further comprising:
refraining from monitoring the shared data channel based at least in part on each of the plurality of control resource sets corresponding to the same quasi co-location assumption that differs from the quasi co-location assumption of the shared data channel.

4. The method of claim 1, wherein monitoring further comprises:
monitoring a plurality of control resource sets comprising the at least one control resource set via a first beam of the plurality of receive beams and the shared data channel via a second beam of the plurality of receive beams based at least in part on the priority rule indicating to monitor the plurality of control resource sets via the first beam when each of the plurality of control resource sets corresponds to a same quasi co-location assumption that differs from a second quasi co-location assumption of the shared data channel.

5. The method of claim 1, wherein monitoring further comprises:
monitoring, via the plurality of receive beams, a plurality of control resource sets comprising the at least one control resource set based at least in part on the priority rule indicating to monitor the plurality of control resource sets when the plurality of control resource sets and the shared data channel each correspond to a different respective quasi co-location assumption.

6. The method of claim 1, wherein monitoring further comprises:
monitoring the at least one control resource set of a plurality of control resource sets via a first beam of the plurality of receive beams and monitoring the shared data channel and a second control resource set of the plurality of control resource sets via a second beam of the plurality of receive beams based at least in part on the priority rule indicating to monitor the at least one control resource set via the first beam and to monitor the shared data channel and the second control resource set via the second beam when the second control resource set and the shared data channel correspond to a same quasi co-location assumption.

7. The method of claim 1, wherein the at least one control resource set is a single control resource set associated with a plurality of transmission configuration indicator states, wherein monitoring further comprises:
monitoring the single control resource set via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states when the plurality of transmission configuration indicator states each correspond to a different quasi co-location assumption than the shared data channel.

8. The method of claim 1, wherein the at least one control resource set is a single control resource set associated with a plurality of quasi co-location assumptions, wherein monitoring further comprises:
monitoring the single control resource set via a first beam of the plurality of receive beams associated with a first quasi co-location assumption of the plurality of quasi co-location assumptions and via a second beam of the plurality of receive beams associated with a second quasi co-location assumption of the plurality of quasi co-location assumptions, and monitoring the shared data channel via the second beam, when the single control resource set and the shared data channel correspond to a same quasi co-location assumption.

9. The method of claim 1, wherein the shared data channel corresponds to a first quasi co-location assumption and a second quasi co-location assumption, and wherein monitoring further comprises:
monitoring, via the plurality of receive beams, a plurality of control resource sets comprising the at least one control resource set based at least in part on the priority rule indicating to monitor the plurality of control resource sets when each of the plurality of control resource sets corresponds to a same quasi co-location assumption that differs from the first quasi co-location assumption and the second quasi co-location assumption of the shared data channel.

10. The method of claim 9, further comprising:
refraining from monitoring the shared data channel based at least in part on each of the plurality of control resource sets corresponding to the same quasi co-location assumption that differs from the first quasi co-location assumption and the second quasi co-location assumption of the shared data channel.

11. The method of claim 1, wherein the shared data channel corresponds to a first quasi co-location assumption and a second quasi co-location assumption, and wherein monitoring further comprises:
monitoring, via the plurality of receive beams, a plurality of control resource sets comprising the at least one control resource set via a first beam and the shared data channel using a second beam corresponding to one of the first quasi co-location assumption or the second quasi co-location assumption based at least in part on the priority rule indicating to monitor the plurality of control resource sets when the plurality of control resource sets each correspond to a same quasi co-location assumption that differs from the first quasi co-location assumption and the second quasi co-location assumption of the shared data channel.

12. The method of claim 1, wherein the shared data channel corresponds to a first quasi co-location assumption and a second quasi co-location assumption, and wherein monitoring further comprises:
monitoring the at least one control resource set of a plurality of control resource sets via a first beam of the plurality of receive beams and monitoring the shared data channel and a second control resource set of the plurality of control resource sets via a second beam of the plurality of receive beams based at least in part on the priority rule indicating to monitor the at least one control resource set via the first beam and to monitor the shared data channel and the second control resource set via the second beam when the second control resource set corresponds to a same quasi co-location assumption as the first quasi co-location assumption or the second quasi co-location assumption for the shared data channel.

13. The method of claim 1, wherein the shared data channel corresponds to a first quasi co-location assumption and a second quasi co-location assumption, and wherein monitoring further comprises:
monitoring, via the plurality of receive beams, a plurality of control resource sets comprising the at least one control resource set based at least in part on the priority rule indicating to monitor the plurality of control resource sets when the plurality of control resource sets each correspond to a different quasi co-location assumption that differs from the first quasi co-location assumption, the second quasi co-location assumption, or both of the shared data channel.

14. The method of claim 1, wherein the shared data channel corresponds to a first quasi co-location assumption and a second quasi co-location assumption, and wherein monitoring further comprises:
monitoring the at least one control resource set of a plurality of control resource sets via a first beam of the plurality of receive beams and monitoring the shared data channel and a second control resource set of the plurality of control resource sets via a second beam of the plurality of receive beams based at least in part on the priority rule indicating to monitor the at least one control resource set via the first beam and to monitor the shared data channel and the second control resource set via the second beam when the second control resource set corresponds to a same quasi co-location assumption as the first quasi co-location assumption or the second quasi co-location assumption for the shared data channel.

15. The method of claim 1, wherein the shared data channel corresponds to a first quasi co-location assumption and a second quasi co-location assumption, and wherein monitoring further comprises:
monitoring a first control resource set of the at least one control resource set and the shared data channel via a first beam of the plurality of receive beams, and monitoring a second control resource set of the at least one control resource set and the shared data channel via a second beam of the plurality of receive beams, based at least in part on the priority rule indicating to monitor the first control resource set and the shared data channel via the first beam and to monitor the second control resource set and the shared data channel via the second beam when the first control resource set corresponds to the first quasi co-location assumption and the second control resource set corresponds to the second quasi co-location assumption.

16. The method of claim 1, wherein the at least one control resource set is a single control resource set associated with a plurality of transmission configuration indicator states, the shared data channel corresponds to a first quasi co-location assumption and a second quasi co-location assumption, or both, wherein monitoring further comprises:
monitoring the single control resource set via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states when the plurality of transmission configuration indicator states each correspond to a respective different quasi co-location assumption than the first quasi co-location assumption and the second quasi co-location assumption.

17. The method of claim 16, further comprising:
refraining from monitoring the shared data channel based at least in part on the plurality of transmission configuration indicator states each corresponding to the respective different quasi co-location assumptions than the first quasi co-location assumption and the second quasi co-location assumption.

18. The method of claim 1, wherein the at least one control resource set is a single control resource set associated with a plurality of transmission configuration indicator states, the shared data channel corresponds to a first quasi co-location assumption and a second quasi co-location assumption, or both, wherein monitoring further comprises:
monitoring the single control resource set via a first beam of the plurality of receive beams associated with a first transmission configuration indicator state of the plurality of transmission configuration indicator states and via a second beam of the plurality of receive beams associated with a second transmission configuration indicator state of the plurality of transmission configuration indicator states, and monitoring the shared data channel via the second quasi co-location assumption when one of the plurality of transmission configuration indicator states of the single control resource set corresponds to the first quasi co-location assumption or the second quasi co-location assumption.

19. The method of claim 1, further comprising:
receiving at least one control message via the at least one control resource set, a data message via the shared data channel, or both, based at least in part on the monitoring.

20. The method of claim 1, wherein a time difference between the control message and a scheduled occasion to monitor the shared data channel fails to satisfy a threshold time duration, one or more quasi co-location assumptions of the shared data channel comprises a default assumption, the one or more quasi co-location assumptions of the shared data channel are based on one or more multiplexing schemes, the shared data channel and the at least one control resource set are in different component carriers for intra-band carrier aggregation, or any combination thereof.

21. A user equipment (UE) for wireless communications, comprising:
one or more memories storing processor-executable code; and
one or more processors coupled with the one or more memories and individually or collectively operable to execute the code to cause the UE to:
receive control signaling indicating to the UE to monitor at least one control resource set and indicating a priority rule for allocating a plurality of receive beams of the UE for monitoring the at least one control resource set when the at least one control resource set overlaps in time with a shared data channel;
receive a control message indicating to the UE to monitor the shared data channel that overlaps in time with the at least one control resource set; and
monitor, via the plurality of receive beams, the at least one control resource set, the shared data channel, or both, based at least in part on the priority rule for allocating the plurality of receive beams of the UE for monitoring of the at least one control resource set, the shared data channel, or both.

22. The UE of claim 21, wherein, to monitor, the one or more processors are individually or collectively operable to execute the code to cause the UE to:
monitor, via the plurality of receive beams, a plurality of control resource sets comprising the at least one control resource set based at least in part on the priority rule indicating to monitor the plurality of control resource sets when each of the plurality of control resource sets corresponds to a same quasi co-location assumption that differs from a quasi co-location assumption of the shared data channel.

23. The UE of claim 21, wherein, to monitor, the one or more processors are individually or collectively operable to execute the code to cause the UE to:
monitor a plurality of control resource sets comprising the at least one control resource set via a first beam of the plurality of receive beams and the shared data channel via a second beam of the plurality of receive beams based at least in part on the priority rule indicating to monitor the plurality of control resource sets via the first beam when each of the plurality of control resource sets corresponds to a same quasi co-location assumption that differs from a second quasi co-location assumption of the shared data channel.

24. The UE of claim 21, wherein, to monitor, the one or more processors are individually or collectively operable to execute the code to cause the UE to:
monitor, via the plurality of receive beams, a plurality of control resource sets comprising the at least one control resource set based at least in part on the priority rule indicating to monitor the plurality of control resource sets when the plurality of control resource sets and the shared data channel each correspond to a different respective quasi co-location assumption.

25. The UE of claim 21, wherein, to monitor, the one or more processors are individually or collectively operable to execute the code to cause the UE to:
monitor the at least one control resource set of a plurality of control resource sets via a first beam of the plurality of receive beams and monitoring the shared data channel and a second control resource set of the plurality of control resource sets via a second beam of the plurality of receive beams based at least in part on the priority rule indicating to monitor the at least one control resource set via the first beam and to monitor the shared data channel and the second control resource set via the second beam when the second control resource set and the shared data channel correspond to a same quasi co-location assumption.

26. The UE of claim 21, wherein the at least one control resource set is a single control resource set associated with a plurality of quasi co-location assumptions, and wherein, to monitor, the one or more processors are individually or collectively operable to execute the code to cause the UE to:
monitor the single control resource set via a first beam of the plurality of receive beams associated with a first quasi co-location assumption of the plurality of quasi co-location assumptions and via a second beam of the plurality of receive beams associated with a second quasi co-location assumption of the plurality of quasi co-location assumptions, and monitoring the shared data channel via the second beam, when the single control resource set and the shared data channel correspond to a same quasi co-location assumption.

27. The UE of claim 21, wherein the shared data channel corresponds to a first quasi co-location assumption and a second quasi co-location assumption, and wherein, to monitor, the one or more processors are individually or collectively operable to execute the code to cause the UE to:
monitor, via the plurality of receive beams, a plurality of control resource sets comprising the at least one control resource set based at least in part on the priority rule indicating to monitor the plurality of control resource sets when each of the plurality of control resource sets corresponds to a same quasi co-location assumption that differs from the first quasi co-location assumption and the second quasi co-location assumption of the shared data channel.

28. An apparatus for wireless communication at a user equipment (UE), comprising:
means for receiving control signaling indicating to the UE to monitor at least one control resource set and indicating a priority rule for allocating a plurality of receive beams of the UE for monitoring the at least one control resource set when the at least one control resource set overlaps in time with a shared data channel;
means for receiving a control message indicating to the UE to monitor the shared data channel that overlaps in time with the at least one control resource set; and
means for monitoring, via the plurality of receive beams, the at least one control resource set, the shared data channel, or both, based at least in part on the priority rule for allocating the plurality of receive beams of the UE for monitoring of the at least one control resource set, the shared data channel, or both.

29. A non-transitory computer-readable medium storing code for wireless communication at a user equipment (UE), the code comprising instructions executable by a processor to:
receive control signaling indicating to the UE to monitor at least one control resource set and indicating a priority rule for allocating a plurality of receive beams of the UE for monitoring the at least one control resource set when the at least one control resource set overlaps in time with a shared data channel;
receive a control message indicating to the UE to monitor the shared data channel that overlaps in time with the at least one control resource set; and
monitor, via the plurality of receive beams, the at least one control resource set, the shared data channel, or both, based at least in part on the priority rule for allocating the plurality of receive beams of the UE for monitoring of the at least one control resource set, the shared data channel, or both.

* * * * *